(12) United States Patent
Park et al.

(10) Patent No.: US 11,343,164 B2
(45) Date of Patent: May 24, 2022

(54) METHOD AND APPARATUS FOR MANAGING NETWORK QUALITY IN COMMUNICATION SYSTEM

(71) Applicant: Samsung Electronics Co., Ltd., Suwon-si (KR)

(72) Inventors: Kibeom Park, Hwaseong-si (KR); Eunjin Choi, Suwon-si (KR); Jae-Gon Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/616,305

(22) PCT Filed: May 21, 2018

(86) PCT No.: PCT/KR2018/005763
§ 371 (c)(1),
(2) Date: Nov. 22, 2019

(87) PCT Pub. No.: WO2018/216976
PCT Pub. Date: Nov. 29, 2018

(65) Prior Publication Data
US 2020/0092184 A1    Mar. 19, 2020

(30) Foreign Application Priority Data

May 22, 2017 (KR) .................. 10-2017-0063049

(51) Int. Cl.
*H04W 4/00* (2018.01)
*H04L 43/08* (2022.01)
(Continued)

(52) U.S. Cl.
CPC .......... *H04L 43/08* (2013.01); *H04L 41/0806* (2013.01); *H04L 41/5016* (2013.01); *H04L 41/5038* (2013.01); *H04L 43/50* (2013.01)

(58) Field of Classification Search
None
See application file for complete search history.

(56) References Cited

U.S. PATENT DOCUMENTS

| | | | |
|---|---|---|---|
| 2003/0016627 A1* | 1/2003 | MeLampy | H04L 41/0213 370/235 |
| 2010/0020717 A1* | 1/2010 | McGregor | H04M 3/2227 370/252 |

(Continued)

FOREIGN PATENT DOCUMENTS

| | | |
|---|---|---|
| CN | 106130769 A | 11/2016 |
| EP | 3 099 015 A1 | 11/2016 |

(Continued)

OTHER PUBLICATIONS

Extended European Search Report dated Mar. 26, 2020, issued in European Application No. 18806079.2.
(Continued)

*Primary Examiner* — Phyllis A Book
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). Provided are a method and an apparatus for network quality management. An operating method of a controller apparatus for measuring a network quality according to various embodiments of the present disclosure comprises the steps of: receiving a message including information on targets, the network quality of which is to be measured; determining a path between the targets; transmitting information on the path to at least one different network element (NE); and transmitting a measurement request message to at least one of the targets so as to measure the network quality on the basis of the information on the path. Therefore, the method (Continued)

and the apparatus according to various embodiments of the present disclosure can efficiently manage the quality of a network.

12 Claims, 29 Drawing Sheets

(51) Int. Cl.
*H04L 41/0806* (2022.01)
*H04L 41/5009* (2022.01)
*H04L 43/55* (2022.01)
*H04L 43/50* (2022.01)

(56) References Cited

U.S. PATENT DOCUMENTS

| 2013/0163424 | A1* | 6/2013 | Goerke | H04L 43/16 370/235 |
|---|---|---|---|---|
| 2013/0336128 | A1* | 12/2013 | Shaw | H04L 47/323 370/241.1 |
| 2014/0094172 | A1* | 4/2014 | Omar | H04W 60/04 455/435.1 |
| 2014/0119221 | A1 | 5/2014 | Park et al. | |
| 2016/0014007 | A1 | 1/2016 | Karame | |
| 2017/0041231 | A1 | 2/2017 | Seed et al. | |
| 2017/0086084 | A1* | 3/2017 | Jarvis | H04W 24/10 |
| 2017/0302539 | A1 | 10/2017 | Park et al. | |
| 2018/0077032 | A1 | 3/2018 | Park et al. | |
| 2018/0152369 | A1* | 5/2018 | McCallen | H04L 43/106 |
| 2019/0052551 | A1* | 2/2019 | Barczynski | H04L 67/1008 |

FOREIGN PATENT DOCUMENTS

| EP | 3 267 624 A1 | 1/2018 | |
|---|---|---|---|
| KR | 10-2014-0053654 A | 5/2014 | |
| KR | 10-2015-0014739 A | 2/2015 | |
| KR | 10-2016-0108027 A | 9/2016 | |
| KR | 10-2016-0115050 A | 10/2016 | |
| WO | 2016/012992 A1 | 1/2016 | |
| WO | WO-2016012991 A1 * | 1/2016 | ......... H04L 43/0852 |
| WO | 2016/032034 A1 | 3/2016 | |
| WO | 2016/144068 A1 | 9/2016 | |

OTHER PUBLICATIONS

European Office Action dated Jan. 27, 2021, issued in a counterpart European Application No. 18 806 079.2-1216.
Korean Office Action dated Apr. 6, 2021, issued in a counterpart Korean Application No. 10-2017-0063049.
Korean Office Action dated Oct. 29, 2021, issued in a counterpart Korean Application No. 10-2017-0063049.
Chinese Office Action dated Nov. 3, 2021, issued in a counterpart Chinese Application No. 201880034302.7.

* cited by examiner

FIG. 23F

METHOD AND APPARATUS FOR MANAGING NETWORK QUALITY IN COMMUNICATION SYSTEM

TECHNICAL FIELD

The disclosure relates generally to a communication system and, more particularly, to a method and an apparatus for managing network quality in a communication system.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In line with evolution of network technologies, next-generation networks, which are represented by $5^{th}$ generation (5G) and clouds, require a higher level of quality of experience (QoE) by users. From the viewpoint of QoE, existing wireless communication schemes require only increased bandwidths, but major requirements of next-generation networks include low delay and low jitter, which need real-time responsiveness and mutual reactivity. In addition, a large number of devices, represented by Internet of Things (IoT), need to be controlled in the next-generation networks, and this may increase the network complexity exponentially. Furthermore, since multiple service providers constitute a single network, satisfying a service level agreement (SLA) among the multiple network operators may be an important factor that may have a direct influence not only on network quality management, but also on actual network operating costs.

DISCLOSURE OF INVENTION

Technical Problem

Various embodiments of the disclosure may provide a method and an apparatus capable of providing a network service assurance in an incorporated manner by using a software-defined network (SDN) and a network function virtualization (NFV) technology.

Various embodiments of the disclosure may provide a method and an apparatus for securing the visibility of the entire interval for testing network quality by using the SDN technology in a communication system, and managing the network quality by using an SDN orchestration device.

Various embodiments of the disclosure may provide a method and an apparatus for testing and managing the entire quality test interval with regard to each lower-level interval by using an SDN test scheme in a communication system.

Various embodiments of the disclosure may provide a method and an apparatus for dynamically controlling the test performance and capacity by using a software-based network function virtualization (NFV) technology in a communication system, and testing the network quality regardless of the performance and capacity of hardware equipment.

Various embodiments of the disclosure may provide a method and an apparatus for testing network quality regarding various physical/logical network elements (NEs) within a data center in a communication system.

Various embodiments of the disclosure may provide a method and an apparatus for removing a failure occurring to a data center in a communication system.

Various embodiments of the disclosure may provide a method and an apparatus regarding a user interface for managing, in an incorporated manner, network quality regarding an NE of a data center in a communication system, and providing a service guarantee.

Various embodiments of the disclosure provide a method and an apparatus for managing service quality with regard to a path along which traffic moves in real time with regard to NEs of a data center in a communication system, and with regard to each interval constituting the path.

Various embodiments of the disclosure may provide a method and an apparatus for not only testing network quality in real time with regard to NEs of a data center in a communication system, but also statistically managing the results of measured network quality, thereby statistically analyzing the cause of quality degradation.

Solution to Problem

According to various embodiments of the disclosure, a method for operating a management device for testing network quality in a communication system includes: configuring at least one target for testing network quality and a test condition; transmitting a test request message including information regarding the at least one target and the test condition to a controller device configured to control a path related to the at least one target; receiving information regarding network quality measured with regard to the path, based on the test condition; and displaying the information regarding network quality.

According to various embodiments of the disclosure, a method for operating a controller device for testing network quality in a communication system includes: receiving a message including information regarding targets for testing network quality; determining a path between the targets; transmitting information regarding the path to at least one different network element (NE); and transmitting a test request message to at least one of the targets such that the network quality is measured based on the information.

According to various embodiments of the disclosure, a method for operating a server device for testing network quality in a communication system includes: receiving a test request message including a test condition and information regarding a path between targets for testing network quality; generating, based on the test condition, a test packet; and testing, based on the information regarding a path and the test packet, network quality with regard to the targets.

According to various embodiments of the disclosure, a management device for testing network quality in a communication system includes: a processor configured to configure at least one target for testing network quality and a test condition; a communication unit configured to transmit a test request message including information regarding the at least one target and the test condition to a controller device configured to control a path related to the at least one target, and configured to receive information regarding network quality measured with regard to the path, based on the test condition; and a display configured to display the information regarding network quality.

According to various embodiments of the disclosure, a controller device for testing network quality in a communication system includes: a communication unit configured to receive a message including information regarding targets for testing network quality; and a processor configured to determine a path between the targets. The communication unit is configured to transmit information regarding the path to at least one different network element (NE), and to transmit a test request message to at least one of the targets such that the network quality is measured based on the information.

According to various embodiments of the disclosure, a server device for testing network quality in a communication system includes: a communication unit configured to receive a test request message including a test condition and information regarding a path between targets for testing network quality; and a processor configured to generate, based on the test condition, a test packet and to test, based on the information regarding a path and the test packet, network quality with regard to the targets.

Advantageous Effects of Invention

A method and an apparatus according to various embodiments of the disclosure configure a network by using a software-defined network (SDN) and a network function virtualization (NFV) technology, and test network quality regarding network elements (NEs) constituting the network, thereby enabling more efficient network quality management.

Effects which can be acquired by the disclosure are not limited to the above described effects, and other effects that have not been mentioned may be clearly understood by those skilled in the art from the following description.

BRIEF DESCRIPTION OF DRAWINGS

FIG. 23A to FIG. 23F illustrate examples of a user interface (UI) for displaying the result of a network quality test in a communication system according to various embodiments of the disclosure.

BEST MODE FOR CARRYING OUT THE INVENTION

Figure 1:
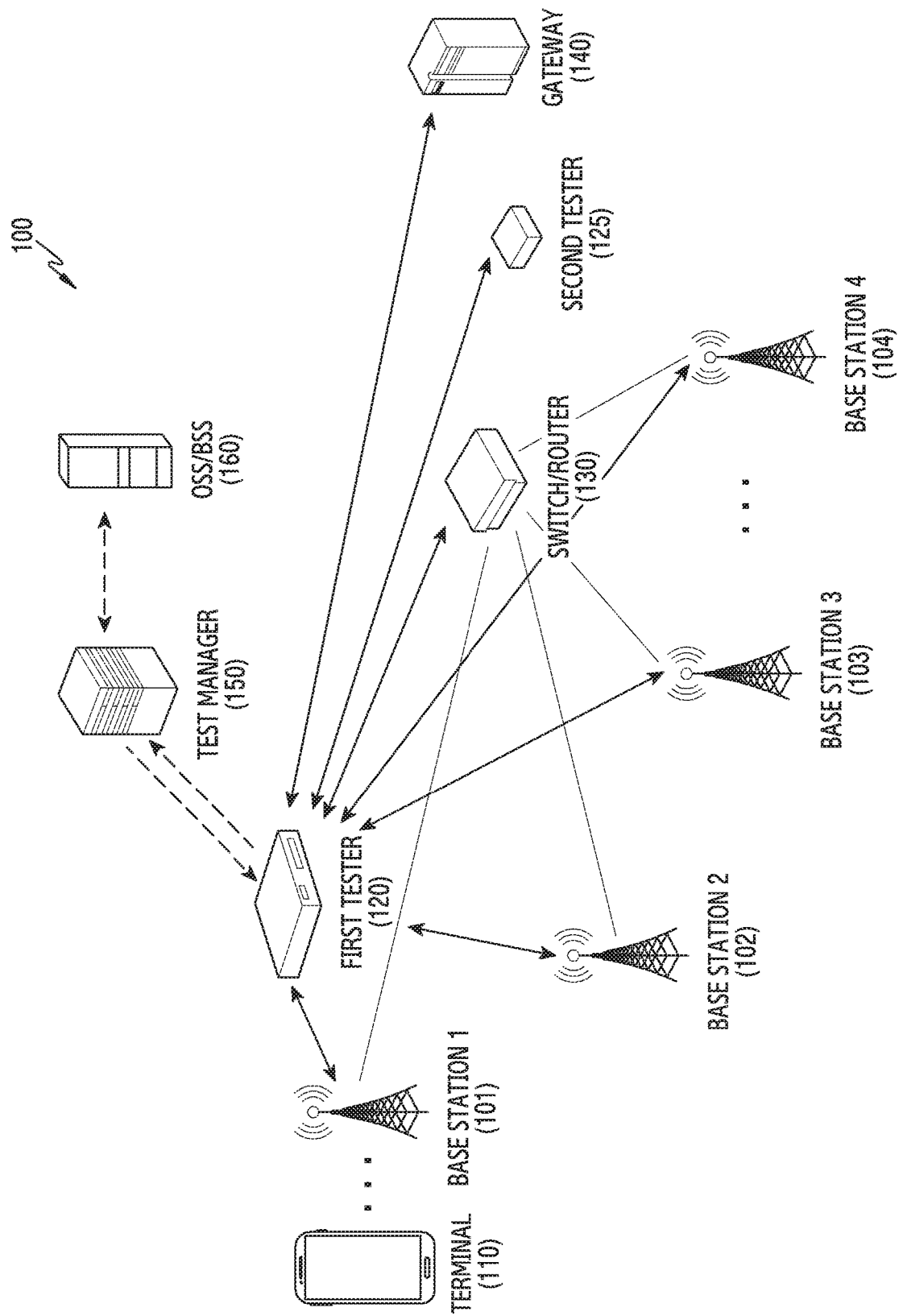
FIG. 1 illustrates a communication system according to various embodiments of the disclosure.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

Hereinafter, the disclosure relates to an apparatus and a method for managing network quality in a wireless communication system. Specifically, the disclosure describes a technology for conducting quality management and service assurance in a software-defined network (SDN) by using network function virtualization (NFV) in a wireless communication system. The index of service quality to be managed in the disclosure may include, for example, quality of experience (QoE). As will be used in the following description, terms denoting parameters related to display of data (for example, target entity, data time interval, resource level, and data type level), terms denoting network entities, terms denoting a device's constituent elements (modified appropriately according to the disclosure), and the like are examples given for convenience of description. Therefore, the disclosure is not limited to the following terms, and other terms having equivalent technical meanings may be used instead.

Hereinafter, terms used in this disclosure will be defined as follows:

"Soft-defined networking (SDN)" refers to a technology for dividing a control area in an individual network element (NE) constituting a network into accessible devices, and logically controlling and managing the network by using an application in the accessible devices. In the SDN, respective individual NEs may be programmed through an open application programming interface (API) such that the same can be controlled or managed. In other words, the network and/or the NEs may be managed in a centralized type according to the SDN.

"Network function virtualization (NFV)" refers to a technology for virtualizing hardware equipment constituting a network such that an upper-level entity (for example, server) implements the same as software. When the NFV technology is applied, virtualization of hardware equipment may make any separate hardware equipment unnecessary.

"A network path" refers to a route along which a packet or data is transmitted between two NEs. For example, in the case of communication between first and second terminals in a single base station cell, the network path between the two terminals may be "first terminal->base station->second terminal". It can also be stated in this case that "the network path between the first and second terminals includes the first terminal, the base station, and the second terminal". When the network path between two specific NEs solely includes the two NEs, as a special case of the network path, the two NEs are directly connected, and the network path between the two NEs may be referred to as "a direction path". A network path may simply be referred to as "a path".

FIG. 1 illustrates a communication system 100 according to various embodiments of the disclosure. Referring to FIG. 1, the system 100 for network quality management (or simply referred to as a system 100) may include NEs such as a first base station 101 to a fourth base station 104, a terminal 110, a first tester 120, a second tester 125, a switch/router 130, a gateway 140, a test manager 150, and an operational support system/business support system (OSS/BSS) 160.

In order to test network quality in the system 100, the test manager 150 may transmit a test request to the first tester 120. In response to the test request, the first tester 120 may perform an operation for testing the network quality with the second tester 125. According to various embodiments of the disclosure, the first tester 120 may perform an operation for testing the network quality with the second tester 125 by using an active monitoring technology. Specifically, the first tester 120 may generate a test (probe or measure) packet for testing the network quality, and may transmit the generated test packet to the second tester 125. The second tester 125 may process, as needed, the received test packet, such as storing a parameter related to network test in the received test packet, and may transmit the processed packet or test result packet back to the first tester 120. That is, the first tester 120 may operate as a sender, and the second tester 125 may operate as a reflector. The first tester 120 may transmit the test result packet received from the second tester 125 to the test manager 150, thereby transmitting a test report corresponding to the test request of the test manager 150. After receiving the test result report, the test manager 150 may conduct comprehensive analysis and control of the test result through an interface with the OSS/BSS 160. According to the above-mentioned operations, network quality may be measured and managed with regard to the network path between the first tester 120 and the second tester 125 by using the active monitoring technology.

According to various embodiments of the disclosure, the second tester 125 may embedded in at least one of the first base station 101 to the fourth base station 104, the switch/router 130, and the gateway 140. In this case, the system 100 may include no separate second tester 125. When the second tester 125 is embedded in at least one of the first base station 101 to the fourth base station 104, the switch/router 130, and the gateway 140, quality may be measured and managed with regard to the network path between the first tester 120 and each of the first base station 101 to the fourth base station 104, the switch/router 130, and the gateway 140. As illustrated in FIG. 1, testing the quality with regard to the network path between the first tester 120 and each of the first base station 101 to the fourth base station 104, the switch/router 130, and the gateway 140 is an example, and network quality may also be measured in a similar manner with regard to a network path between any two NEs included in the system 100. As described above, by managing network quality regarding each NE in the system 100, the terminal 110 communicating with at least one of the first base station 101 to the fourth base station 104 may accomplish a high-level user quality-of-service (QoS), and may receive assurance of the service to be provided.

A test of network quality in the system 100 may require separate test equipment such as the first tester 120 and/or the second tester 125, or may require that test equipment be embedded in NEs (for example, the first base station 101 to the fourth base station 104, the switch/router 130, and the gateway 140). Such a hardware-based network quality management scheme may require a huge capital expenditure (CAPEX) for separately installing test equipment or for embedding the same in each NE. Moreover, in the case of the hardware-based network quality management scheme, it may be difficult to manage, in an incorporated manner, information regarding the result of network quality test acquired from multiple pieces of test equipment or from the NEs having test equipment embedded therein. Particularly, it may be difficult to apply the hardware-based network quality management scheme to an NE with a complicated structure, such as a data center (DC).

Therefore, in order to overcome the problems of the hardware-based network quality management scheme, various embodiments of the disclosure provide a method and an apparatus capable of managing network quality by using NFV and SDN technologies and providing service assurance. In other words, various embodiments of the disclosure provide a method and an apparatus for virtualizing hardware devices necessary to configure a network by using NFV technology, programming respective physical/virtual NEs through an open API by using SDN technology, and controlling and managing the same in a centralized manner.

Figure 2:
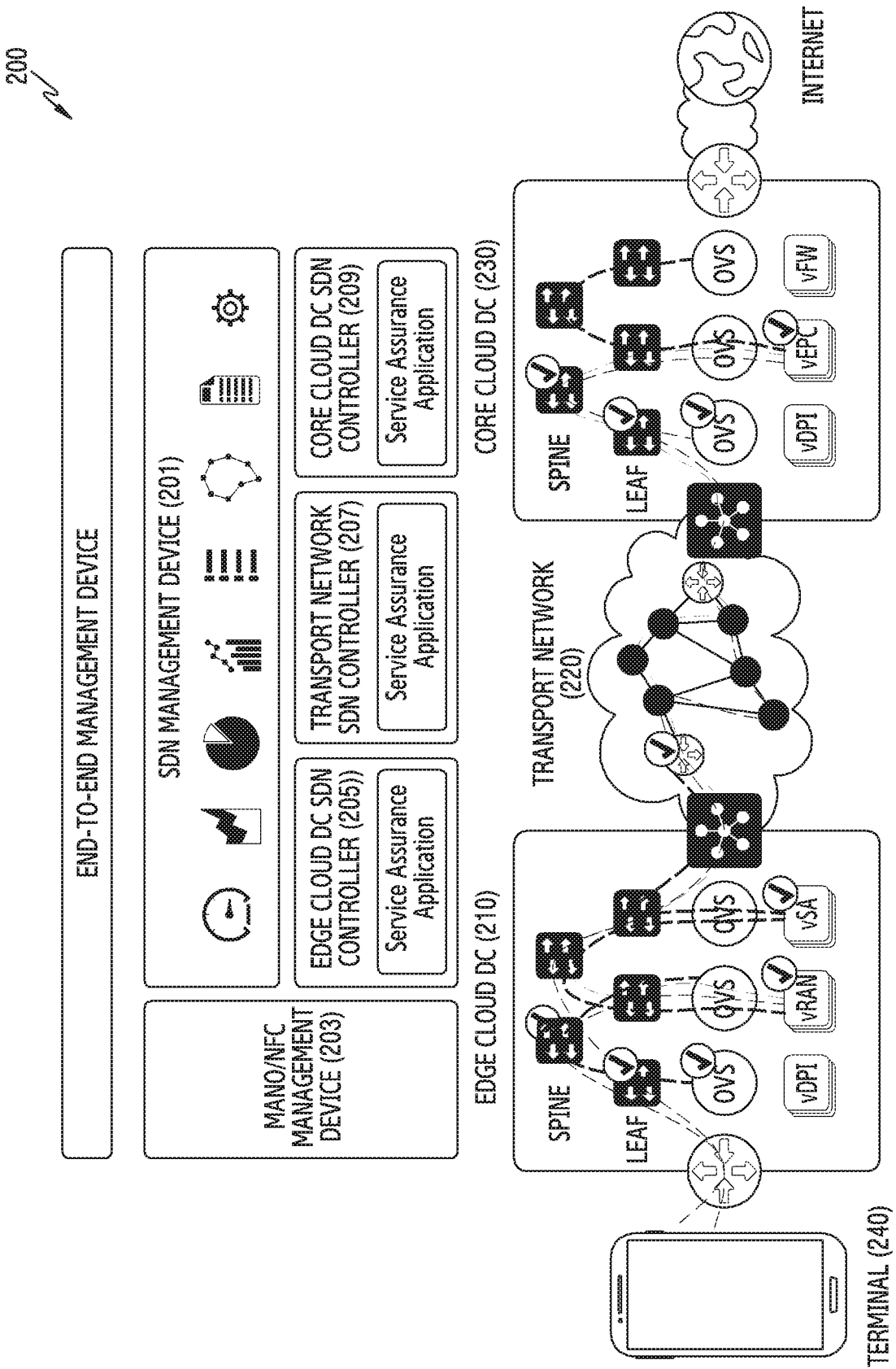
FIG. 2 illustrates a structure for software defined network (SDN)-based network quality management in a communication system according to various embodiments of the disclosure.

FIG. 2 illustrates a structure for SDN-based network quality management in a communication system according to various embodiments of the disclosure. The system 200 may include, as exemplary end-to-end management devices, an SDN management device 201 and a management and an orchestration (MANO)/NFV management device 203. Although the SDN management device 201 and the MANO/NFV management device 203 are illustrated in FIG. 2 as separate entities, the SDN management device 201 and the MANO/NFV management device 203 may be a single incorporated management device for managing physical/virtual NEs. A management device may be referred to as an orchestrator. In addition, the system 200 may include an edge cloud DC SDN controller 205, a transport network controller 207, a core cloud DC controller 209, an edge cloud DC 210, a transport network 220, and a core cloud DC 230.

The SDN management device 201 and/or the MANO/NFV management device 203 may provide the user with an interface for testing, controlling, and managing the network quality. The SDN management device 201 and/or the MANO/NFV management device 203 may receive an input for controlling the network from the user through the interface, and may send a request corresponding to the input to at least one edge cloud DC SDN controller 205, transport network controller 207, and core cloud DC controller 209. In addition, the SDN management device 201 and/or the MANO/NFV management device 203 may receive a result corresponding to the request (for example, information regarding measured network quality) from at least one edge cloud DC SDN controller 205, transport network controller 207, and core cloud DC controller 209 and may display the same.

The edge cloud DC SDN controller 205 may test, control, and manage network quality regarding NEs included in the edge cloud DC 210. The edge cloud DC SDN controller 205 may have a service assurance application, and may receive a command for testing network quality from the SDN management device 201 and/or the MANO/NFV management device 203 through an open API. For example, the edge cloud DC SDN controller 205 may configure a path between NEs for testing network quality in the edge cloud DC 210, and may control such that network quality is measured with regard to a path having at least one NE configured in connection with the configured path. The edge cloud DC SDN controller 205 may receive information regarding the network quality test result from at least one NE, and may provide the same to the SDN management device 201 and/or the MANO/NFV management device 203. The transport network SDN controller 207 and the core cloud DC SDN controller 209 may also perform a function identical or similar to that of the edge cloud DC SDN controller 205, and may test, control, and manage network quality regarding NEs included in the transport network 220 and the core cloud DC 230, respectively.

The edge cloud DC 210 and the core cloud DC 230 may store data to be consumed by the terminal 240. In this regard, the edge cloud DC 210 may be a DC relatively close to the terminal 240 from the viewpoint of the network path, and the core cloud DC 230 may be a DC relatively far from the terminal 240 from the viewpoint of the network path. The transport network 220 may be an NE existing on a path connecting the edge cloud DC 210 and the core cloud DC 230, and may mediate packet exchange between the edge cloud DC 210 and the core cloud DC 230.

As illustrated in FIG. 2, each of the edge cloud DC 210 and the core cloud DC 230 may include multiple switches (for example, spine switches, leaf switches, and open virtual switches (OVS)), multiple virtual machines (VMs) (for example, virtual deep packet inspection (vDPI), virtualized radio access network (vRAN), virtual service assurance (vSA), virtual evolved packet core (vEPC), and virtual firewall (vFW)). The terminal 240 may transmit or receive data through a path extending through multiple switches and/or virtual machines included in each of the edge cloud DC 210 and the core cloud DC 230, as illustrated in FIG. 2. The detailed structure and function of the DC will now be descried in detail with reference to FIG. 3.

Figure 3:
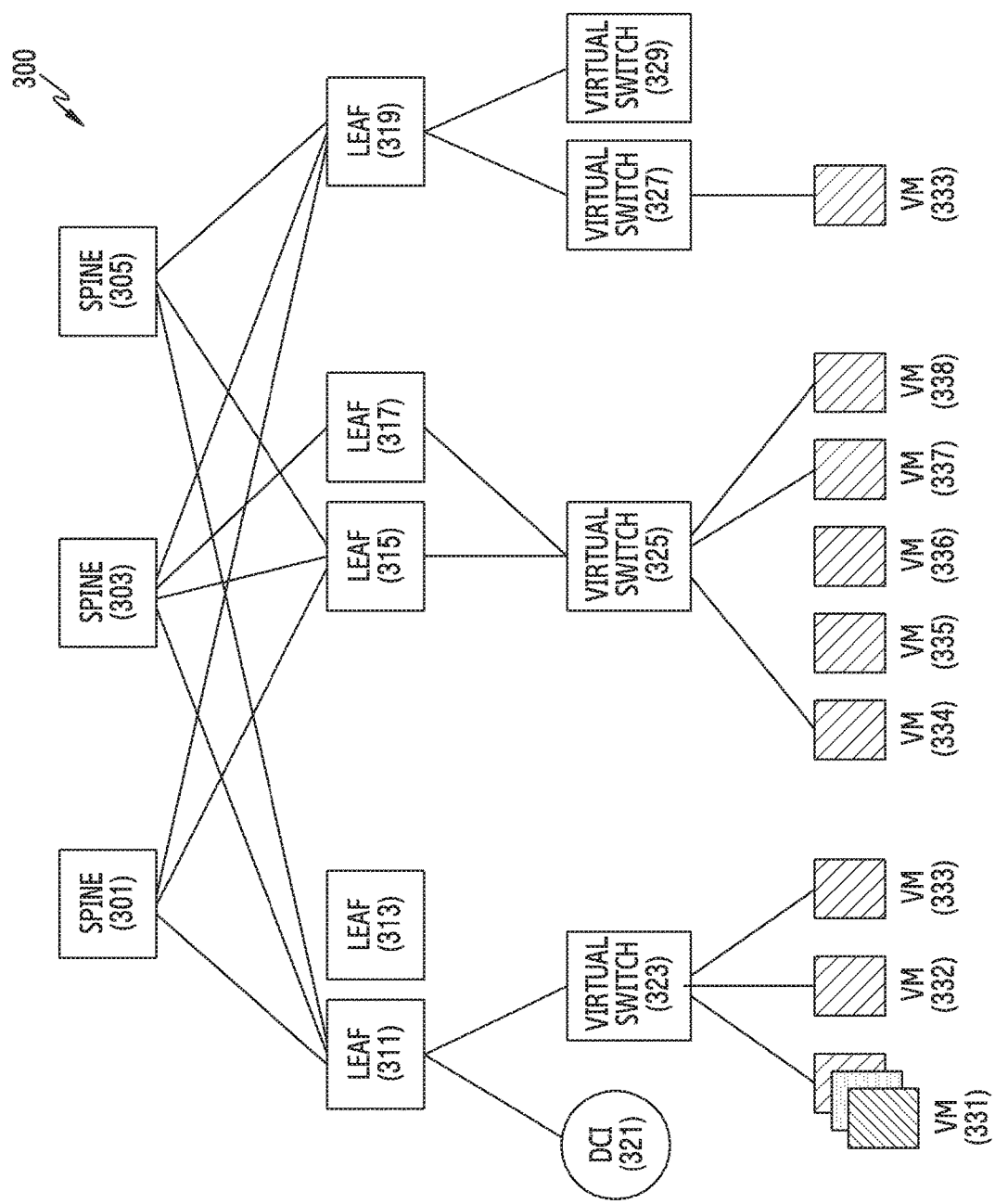
FIG. 3 illustrates the structure of a data center (DC) in a communication system according to various embodiments of the disclosure.

FIG. 3 illustrates the structure of a DC 300 in a communication system according to various embodiments of the disclosure.

The DC 300 may include multiple spine switches 301, 303, and 305, multiple leaf switches 311, 313, 315, 317, and 319, a data center interconnect (DCI) 321, multiple virtual switches 323, 325, 327, and 329, and multiple VMs 331-339. As illustrated in FIG. 3, the DC 300 may include multiple switches and VMs in a hierarchy structure. Hereinafter, spine switches and leaf switches may be simply referred to as "spines" and "leaves", respectively.

The spine 301 may be directly connected to at least one of the leaves 311, 313, 315, 317, and 319. In other words, a direct path may be configured between the spine 301 and at least one leaf 311, 313, 315, 317, and 319, and data or a packet may be exchanged between the spine 301 and at least one leaf 311, 313, 315, 317, and 319 through the direct path. Although not illustrated, the spine 301 may exchange data or a packet with another NE through a direct path with the other NE. The spine 301 may control such that a packet or data received by the spine 301 is transmitted through an appropriate path. For example, when the spine 301 has received a packet from the leaf 311, the spine 301 may determine, based on information included in the transmitted packet, that the received packet needs to be transmitted to the leaf 319, and may transmit the received packet to the leaf 319. Other spines 303 and 305 may also perform the same function as that of the spine 301.

The leaf 311 may be directly connected to at least one of the spines 301, 303, and 305. In addition, the leaf 311 may be directly connected to at least one of the virtual switches 323, 325, 327, and 329 and the DCI 321. Similarly to the spine 301, the leaf 311 may control such that a packet or data received by the leaf 311 is transmitted through an appropriate path. Other leaves 313, 315, 317, and 319 may also perform the same function as that of the leaf 311.

The DCI 321 refers to a set of multiple DCs which have a structure as illustrated in FIG. 3, and which are connected to each other. In other words, the DCI 321 may include multiple DCs, and each of the multiple DCs may include multiple spines, multiple leaves, multiple virtual switches, and multiple VMs. According to various embodiments of the disclosure, a DC constituting the DCI 321 may include only some of the constituent elements of the DC illustrated in FIG. 3. For example, the DC constituting the DCI 321 may solely include at least one virtual switch and at least one VM. Each DC constituting the DCI 321 may be directly connected to the leaf 321, and may exchange a packet or data with another DC through the leaf 311.

The virtual switch 323 may be directly connected to the VMs 331, 332, and 333. In addition, the virtual switch 323 may be directly connected to the leaf 311. The virtual switch 323 may be a virtual logical switch implemented as software, unlike the spines 303, 303, and 305 and the leaves 311, 313, 315, 317, and 319, which are physical switches. The virtual switch 323 may control such that a packet or data received by the virtual switch 323 is transmitted through an appropriate path, similarly to the leaf 311 and/or the spine 301. Other virtual switches 325 and 327 may also perform the same function as that of the virtual switch 323.

The VM 331 refers to a virtual logical processor or computer implemented as software. In addition, the VM 331 may further include a virtual central processing unit (CPU) and a virtual input/output (I/O) device, and may function as an independent device. From the viewpoint of network quality management, the VM 331 may receive a message requesting a network quality test, and may perform an operation for testing network quality with the other VMs 332-339 in response to the message. To this end, the VM 331 may transmit or receive a packet through the virtual switch 323 directly connected to the VM 331. Other VMs 332-339 may also perform the same function as that of the VM 331.

According to various embodiments of the disclosure, the spines 301, 303, and 305 and the leaves 311, 313, 315, 317, and 319 may be physical switches, but may also be implemented as virtual switches by using NFV technology. In addition, all constituent elements of the DC 300 illustrated in FIG. 3 may be controlled in an incorporated manner by a single device (for example, SDN controller) through an open API. Such a DC 300 by which all constituent elements of the DC 300 are controlled in an incorporated manner may be referred to as a software-defined data center (SDDC). The term "DC" used herein may refer to such an SDDC.

Figure 4:
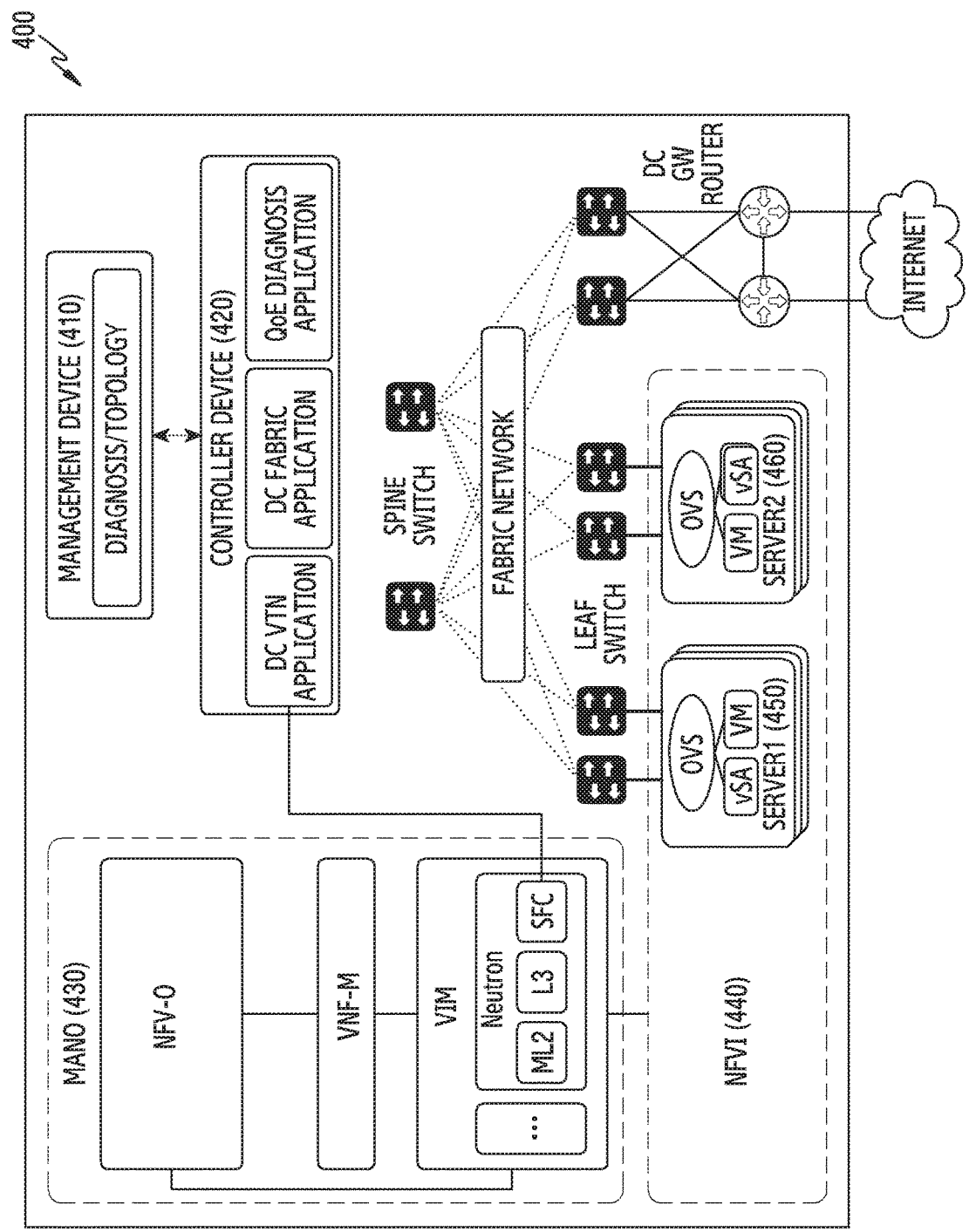
FIG. 4 illustrates a structure for SDN-based network quality management interlinked with network function virtualization (NFV) in a communication system according to various embodiments of the disclosure.

FIG. 4 illustrates a structure for SDN-based network quality management interlinked with NFV in a communication system according to various embodiments of the disclosure. The system 400 includes a management device 410, a controller device 420, an MANO 420, a network function virtualization infrastructure (NFVI) 440, a first server 450, and a second server 460.

The management device 410 may provide the use with an interface for testing, controlling, and managing network quality. For example, the management device 410 may provide the user with an interface through a QoE diagnosis/topology application. The management device 410 may receive an input for controlling the network from the user through the interface, and may send a request corresponding to the input to the controller device 420. In addition, the management device 410 may receive a result corresponding to the request (for example, information regarding measured network quality) from the controller device 420, and may display the same.

The controller device 420 may test, control, and manage network quality regarding NEs included in the DC. The controller device 420 may have service assurance applications such as a DC virtual tenant network (VTN) application, a DC fabric application, and a QoE diagnosis application. Such service assurance applications may communicate with an application of another NE through an open API. For example, the QoE diagnosis application of the controller device 420 may receive a command for testing network quality from the management device 410, and the DC fabric application of the controller device 420 may communicate with at least one NE (for example, spine switch, leaf switch, virtual switch, or virtual machine) included in the DC so as to control and manage the at least one NE. The DC VTN application of the controller device 420 may receive a command from the MANO 430 and may perform an operation corresponding to the command.

The MANO 430 and the NFVI 440 may virtualize a physical hardware device of the system 400, or may generate a virtual device. As a result thereof, the MANO 430 and the NFVI 440 may generate a virtual network. In addition, the MANO 430 and the NFVI 440 may control and manage NEs constituting the virtualized network. For example, the MANO 430 may include functional modules such as network function virtualization-orchestration (NFV-O), virtual network function-management (VNF-M), and virtualized infrastructure manager (VIM), and may support the controller device 420 such that the same can generate and manage a virtual network through the DC VTN application. The NFVI 440 may include devices including virtual NEs such as the first server 450 and the second server 460 (for example, open virtual switch, VM, and virtual service assurance (vSA) device (a type of VM)). The VMs included in the first server 450 and the second server 460 may generate a packet and may transmit the generated packet to another device. The packet transmitted from the VMs may be received by a VM of another server, or may be transmitted to the Internet through a leaf switch, a spine switch, and a DC gateway (GW) router.

Figure 5:
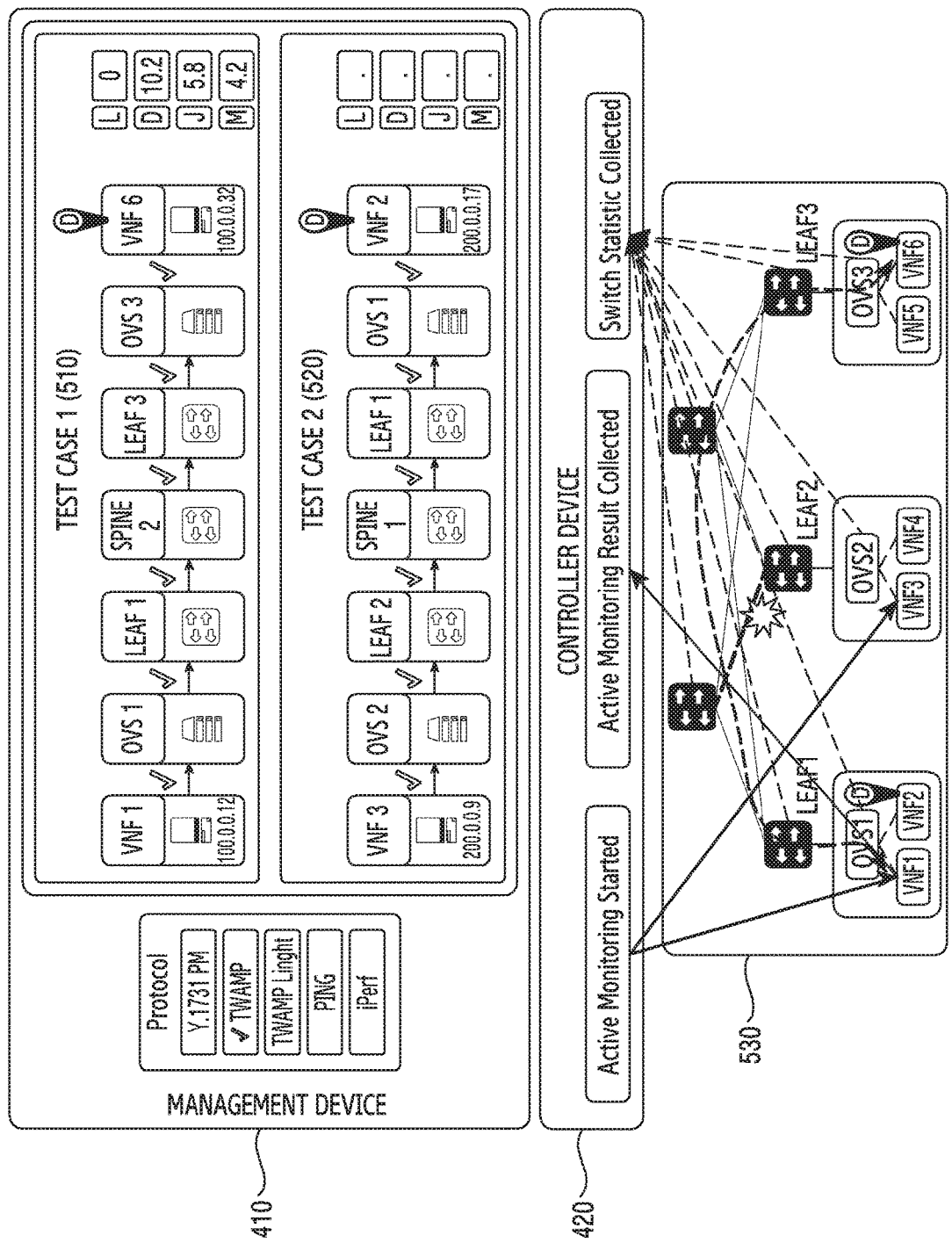
FIG. 5 illustrates a function performed by a network element (NE) for network quality management in a communication system according to various embodiments of the disclosure.

FIG. 5 illustrates a function performed by an NE for network quality management in a communication system according to various embodiments of the disclosure.

The management device 410 may provide the user with an interface for testing, controlling, and managing network quality. The management device 410 may receive a condition for a network quality test (test condition) and information regarding the target for the network quality test (test target) from the user through the interface. Hereinafter, the term "test" will be used interchangeably with "diagnose" or "measure". FIG. 5 illustrates an example of configuring a test condition such that the management device 410 uses a TWAMP protocol when testing network quality according to the user's input, and an example of configuring test targets with regard to respective test cases. For example, in the first test case 510, the first VNF and the sixth VNF are configured as test targets, and in the second test case 520, the third VNF and the second VNF are configured as test targets. The first VNF, the second VNF, the third VNF, and the sixth VNF are a type of VMs, and may generate, transmit, or receive a packet for testing network quality. In this regard, the VNF with "S" mark refers to a target that generates a packet for testing network quality, and the VNF with "D" mark refers to a target that performs a process corresponding to the test condition with regard to the generated packet. Hereinafter, the target that generates a packet for testing network quality may be referred to as "a source target (or source)", and the target that performs a process corresponding to the test condition with regard to the generated packet may be referred to as "a destination target (or destination)". Referring to FIG. 5, in the first test case 510, the source target is the first VNF, and the destination target is the sixth VNF, and in the second test case 520, the source target is the second VNF, and the destination target is the third VNF. The management device 410 may transmit a test request message including information regarding the configured test targets and the test condition to the controller device 420.

The controller device 420 may control, in response to the test request message received from the management device 410, such that network quality between the test targets of the DC 530 is measured. The controller device 420 may configure a path between the test targets, and may transmit a request message to the source target, among the test targets, such that network quality is measured based on the configured path (active monitoring started). In addition, the controller device 420 may receive information regarding the result of measured network quality (active monitoring result collected), and may receive statistical information regarding switches (for example, the first spine, the second spine, the first leaf, the second leaf, the third leaf, the fist OVS, the second OVS, and the third OVS) included in the path between the source target and the destination target while the network quality is measured (switch statistics collected). The statistic information regarding switches may include, for example, information indicating whether or not the packet has been delivered via an appropriate path through the switches, information regarding whether or not elements that degrade network quality exist in the switches, information regarding the degree of network quality degradation, and information regarding whether or not a problem has occurred to the path between the switches. The controller device 420 may transmit the received information regarding the result of network quality and the statistical information regarding the switches to the management device 410.

The management device 410 may receive the information regarding the result of network quality test and the statistical information regarding the switches from the controller device 420, and may display the same through a user interface. FIG. 5 illustrates the management device 410 displaying the result of network quality test regarding the first test case 510 and the result of network quality test regarding the second test case 520. The first test case 510 indicates that the path between test targets configured for a network quality test is first VNF (source target)->first OVS->first leaf->second spine->third leaf->third OVS->sixth VNF (destination target). Such a path between test targets in the first test case 510 may also be inferred from the internal structure of the DC 530. According to the first test case 510, a packet was appropriately transmitted from the source target to the destination target through the path: first VNF->first OVS->first leaf->second spine->third leaf->third OVS->sixth VNF, and corresponding loss (L), delay (D), jitter (J), and mean opinion score (M) values were derived accordingly. The second test case 520 indicates that the path between test targets configured for a network quality test is third VNF (source target)->second OVS->second leaf->first spine->first leaf->first OVS->second VNF (destination target). Such a path between test targets in the second test case 520 may also be inferred from the internal structure of the DC 530. According to the second test case 520, the packet was appropriately transmitted from the third VNF to the second leaf through the path: third VNF->second OVS->second leaf, but failed to be transmitted from the second leaf to the first spine, and L, D, J, and M values failed to be derived. According to the network quality test result in as the second test case 520, the management device 410 may visually display the fact that the second leaf and/or the first spine has a failure such that the user can troubleshoot the second leaf and/or the first spine.

As illustrated in FIG. 5, network quality may be measured with regard to a path between VMs, but according to various embodiments of the disclosure, network quality may also be measured with regard to a path between any two NEs of the DC. Various paths and targets, for which network quality may be measured, will now be described with reference to FIG. 6.

Figure 6:
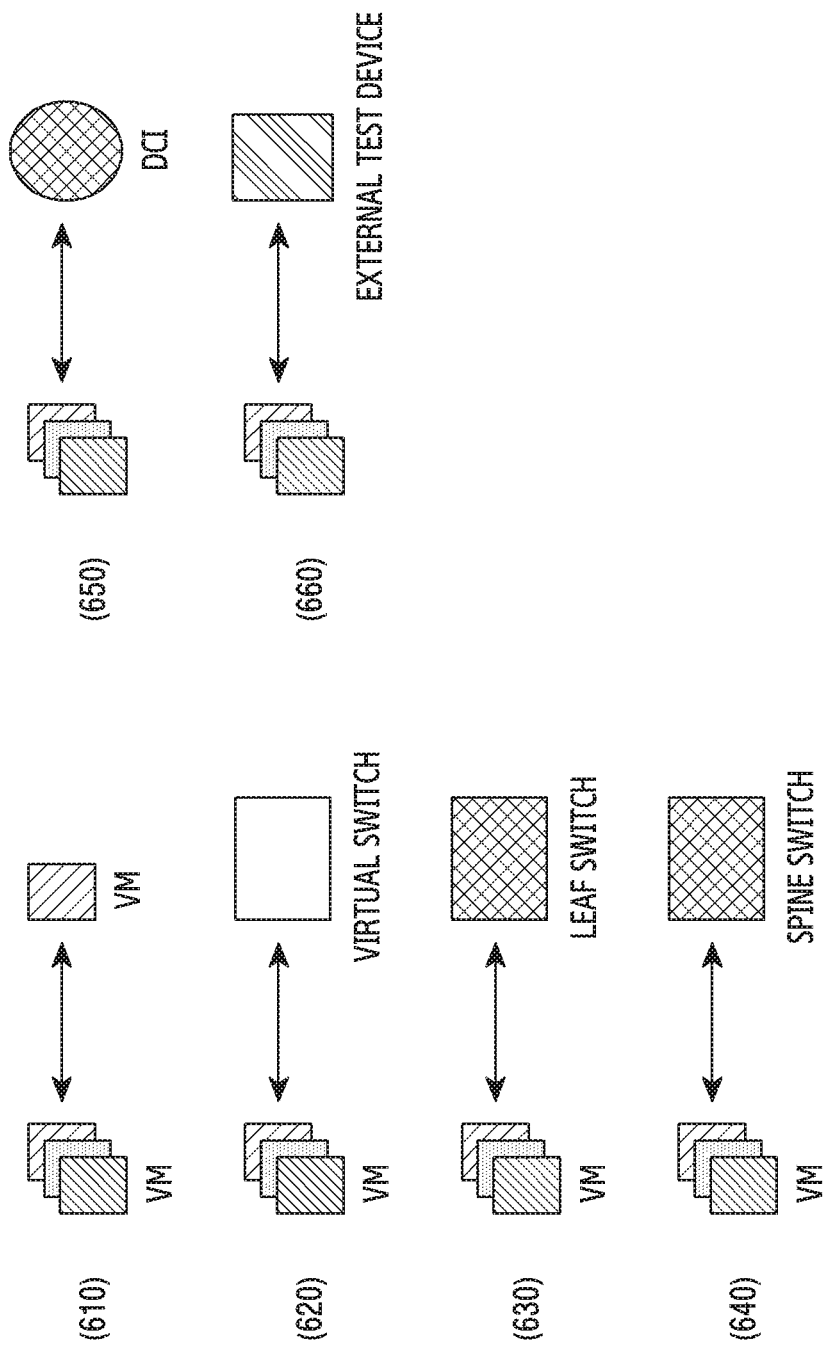
FIG. 6 illustrates the type of targets for which network quality may be measured in a communication system according to various embodiments of the disclosure.

FIG. 6 illustrates the type of targets for which network quality may be measured in a communication system according to various embodiments of the disclosure. According to various embodiments of the disclosure, paths and targets for which network quality may be measured in a DC may be classified into one of the following types:

(1) First type 610: a path between a VM and another VM
(2) Second type 620: a path between a VM and a virtual switch
(3) Third type 630: a path between a VM and a leaf switch
(4) Fourth type 640: a path between a VM and a spine switch
(5) Fifty type 650: a path between a VM and a DCI
(6) Sixth type 650: a path between a VM and an external test device In order to test network quality with regard to a path between two targets, the source target may be required to generate a test packet and to transmit the generated test packet to the destination target, and the destination target may be required to perform a process corresponding to the test condition with regard to the received test packet and to transmit the processed test packet back to the source target. However, NEs of the DC other than the VMs (for example, a virtual switch, a leaf switch, a spine switch, and a DCI) may fail to generate a test packet for testing network quality or to perform a process with regard to the test packet. According to various embodiments of the disclosure, in order to test network quality with regard to a path between two targets, including at least one NE that is not a VM, a path may be configured between the VMs including such a path, and network quality may be indirectly measured by VMs that generate and transmit/receive a test packet with regard to the path between the two targets including at least one NE that is not a VM.

Figure 7:
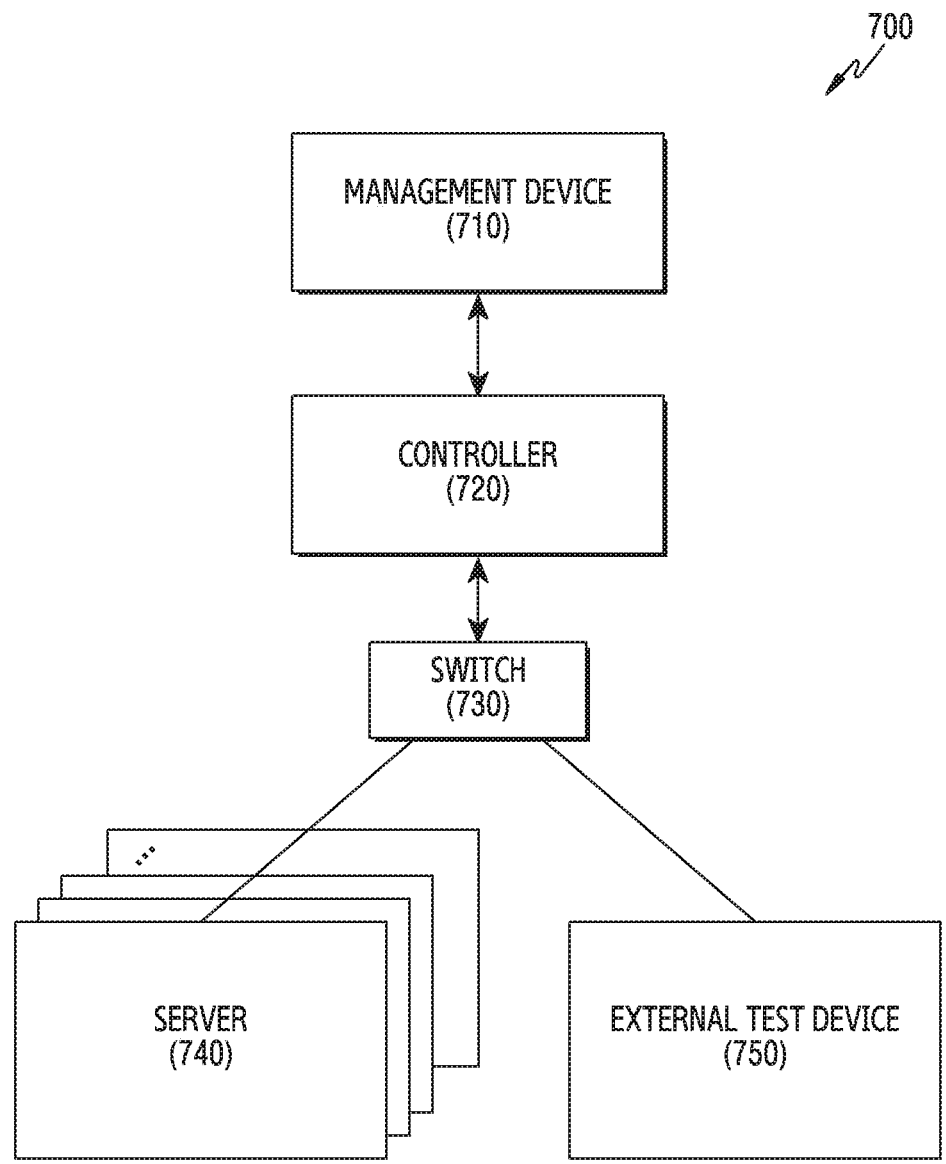
FIG. 7 illustrates NEs in a system for managing network quality in a communication system according to various embodiments of the disclosure.

FIG. 7 illustrates NEs in a system 700 for managing network quality in a communication system according to various embodiments of the disclosure. As illustrated in FIG. 7, the system 700 includes a management device 710 (for example, management device 410), a controller device 720 (for example, controller device 420), a switch 730, multiple servers including a server 740 (for example, first server 450 or second server 460), and an external test device 750.

The management device 710 provides an interface and a function capable of monitoring parameters related to performance of other devices in the network (for example, diagnosis and performance evaluation). The controller device 720 provides functions for controlling configuration/functions related to the SDN of other devices in the network. The switch 730 is equipment for connection between the controller device 720 and other devices (for example, server 740 and external test device 750). The server 740 is a versatile server capable of playing various roles (for example, mobility management entity (MME), gateway, and the like) according to the installed program/application. The external test device 750 is equipment configured to transmit or receive a packet for performance inspection. The external test device 750 is a versatile server, and may be a server including a virtual machine playing the role of a sender or a reflector for performance inspection. Each of the management device 710, the controller device 720, the switch 730, the server 740, and the external test device 750 may include at least one application having an open API, and may communicate with another device through the at least one application. The operation performed by each of the management device 710, the controller device 720, the switch 730, the server 740, and the external test device 750 will now be described in more detailed. In the description, "management device" may be referred to as "SDN management device", and "controller device" may be referred to as "SDN controller device".

Figure 8:
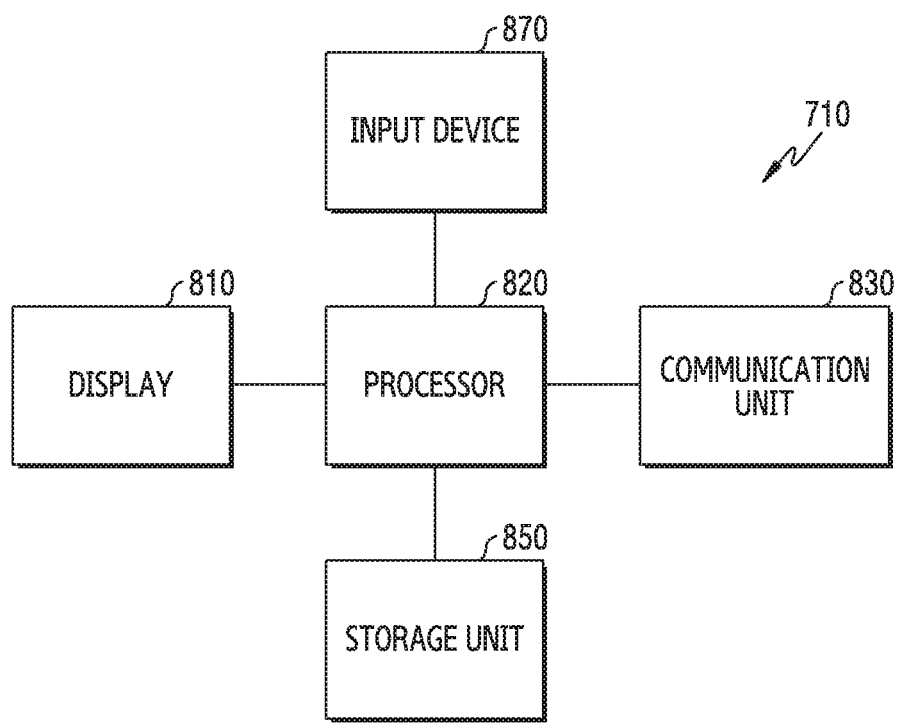
FIG. 8 is a block diagram of an SDN management device in a communication system according to various embodiments of the disclosure.

FIG. 8 is a block diagram of a management device 710 in a communication system according to various embodiments of the disclosure. As used herein, the term " . . . unit" or "-er" refers to a unit entity configured to process at least one function or operation, and may be implemented as hardware, software, or a combination of hardware and software.

Referring to FIG. 8, the management device 710 may include a display 810, a processor 820, a communication unit 830, a storage unit 850, and an input/output (I/O) interface 860.

The display 810 is configured to display a screen including an image, a graphic, a text, and the like. For example, the display 810 may be made of a liquid crystal, a light-emitting diode display, or a different material. The display 810 may display a screen corresponding to data received through the processor 820. In addition, the display 810 may include a touch screen for sensing the user's input.

The processor 820 may control overall operations of the management device 710. For example, the processor 820 may transmit or receive a signal through the communication unit 830. The processor 820 may record data in the storage unit 850, and may read data stored in the storage unit 850. To this end, the processor 820 may include at least one processor or at least one microprocessor. The processor 820 may be configured to implement operating procedures and/or methods of the management device 710 proposed in the disclosure. The processor 820 may control the management device 710 so as to perform operations related to network quality management according to various embodiments described later.

The communication unit 830 may perform functions for transmitting or receiving a signal through a wireless channel. The communication unit 830 may perform a function for conversion between a baseband signal and a bit string according to the physical layer specification of the system. For example, when transmitting data, the communication unit 830 may generate complex symbols by encoding and modulating a transmission bit string. As another example, when receiving data, the communication unit 830 may restore a reception bit string by demodulating and decoding a baseband signal.

The communication unit 830 is configured to provide an interface for performing communication with other nodes in the network. That is, the communication unit 810 converts a bit string transmitted from the management device 710 to another node (for example, base station, core network, or authentication server) into a physical signal, and converts a physical signal received from the other node into a bit string. That is, the communication unit 830 may transmit and receive signals. Accordingly, the communication unit 830 may be referred to as a transmitting unit, a receiving unit, or a transmitting/receiving unit.

The communication unit 830 is configured to enable the management device 710 to communicate with other devices or the system via backhaul connection or via the network. The communication unit 830 may support communication via appropriate wired or wireless connection. For example, when the management device 710 is implemented as a part of a mobile communication system (such as one supporting 5G, LTE, or LTE-A), the communication unit 830 may enable the management device 710 to communicate with other devices via wired or wireless backhaul connection. When the management device 710 is implemented as an access point, the communication unit 830 may enable the management device 710 to communicate via a wired or wireless near-field network, or to communicate with a network having a larger scale (such as the Internet) via wired or wireless connection. The communication unit 830 may include a structure for supporting communication via wired or wireless connection, such as Ethernet or RF transceiver.

The storage unit 850 may store a control instruction code for controlling the management device 710, control data, or user data. For example, the storage unit 850 may include an application, an operating system (OS), middleware, and a device driver. The storage unit 850 may include at least one of a volatile memory or a nonvolatile memory. The volatile memory may include a dynamic RAM (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), and the like. The nonvolatile memory may include a read only memory (ROM), a programmable ROM (PROM), an electrically programmable ROM (EPROM), an electrically erasable ROM (EEPROM), a flash memory, and the like. The storage unit 850 may include a nonvolatile medium such as a hard disk drive (HDD), a solid state disk (SSD), an embedded multimedia card (eMMC), or a universal flash storage (UFS). The storage unit 850 may be operatively coupled to the processor 820.

The input unit 870 may receive an input from the user. To this end, the input unit 870 may include an input interface. The input received through the input unit 710 may be processed by the processor 820 and then transmitted to the display 810, the storage unit 850, and the communication unit 830. As a result thereof, information corresponding to the input received through the input unit 710 may be displayed on the display 810, transmitted to another device through the communication unit 830, or stored in the storage unit 850.

Figure 9:
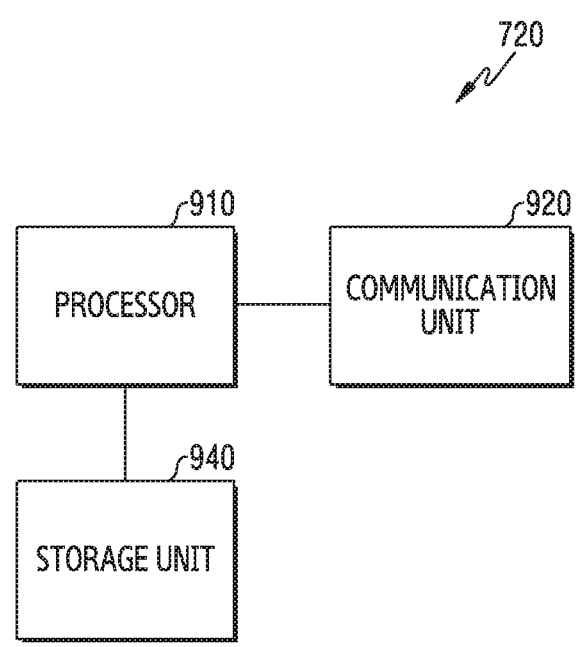
FIG. 9 is a block diagram of an SDN controller device in a communication system according to various embodiments of the disclosure.

FIG. 9 is a block diagram of a controller device 720 in a communication system according to various embodiments of the disclosure. As used herein, the term " . . . unit" or "-er" refers to a unit entity configured to process at least one function or operation, and may be implemented as hardware, software, or a combination of hardware and software.

Referring to FIG. 9, the controller device may include a processor 910, a communication unit 920, and a storage unit 940.

The processor 910 may control overall operations of the management device 720. For example, the processor 910 may transmit or receive a signal through the communication unit 920. The processor 910 may record data in the storage unit 940, and may read data stored in the storage unit 940. To this end, the processor 910 may include at least one processor or at least one microprocessor. The processor 910 may be configured to implement operating procedures and/or methods of the controller device 720 proposed in the disclosure. The processor 910 may control the controller device 720 so as to perform operations related to network quality management according to various embodiments described later.

The communication unit 920 may perform functions for transmitting or receiving a signal through a wireless channel. The communication unit 920 may perform a function for conversion between a baseband signal and a bit string according to the physical layer specification of the system. For example, when transmitting data, the communication unit 920 may generate complex symbols by encoding and modulating a transmission bit string. As another example, when receiving data, the communication unit 920 may restore a reception bit string by demodulating and decoding a baseband signal.

The communication unit 920 is configured to provide an interface for performing communication with other nodes in the network. That is, the communication unit 920 converts a bit string transmitted from the management device 710 to another node (for example, base station, core network, or authentication server) into a physical signal, and converts a physical signal received from the other node into a bit string. That is, the communication unit 920 may transmit and receive signals. Accordingly, the communication unit 920 may be referred to as a transmitting unit, a receiving unit, or a transmitting/receiving unit.

The communication unit 920 is configured to enable the controller device 720 to communicate with other devices or the system via backhaul connection or via the network. The communication unit 920 may support communication via appropriate wired or wireless connection. For example, when the controller device 720 is implemented as a part of a mobile communication system (such as one supporting 5G, LTE, or LTE-A), the communication unit 920 may enable the management device 710 to communicate with other devices via wired or wireless backhaul connection. When the controller device 720 is implemented as an access point, the communication unit 920 may enable the controller device 720 to communicate via a wired or wireless near-field network, or to communicate with a network having a larger scale (such as the Internet) via wired or wireless connection. The communication unit 920 may include a structure for supporting communication via wired or wireless connection, such as Ethernet or RF transceiver.

The storage unit 940 may store a control instruction code for controlling the controller device 720, control data, or user data. For example, the storage unit 940 may include an application, an operating system (OS), middleware, and a device driver. The storage unit 940 may include at least one of a volatile memory or a nonvolatile memory. The volatile memory may include a dynamic RAM (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), and the like. The nonvolatile memory may include a read only memory (ROM), a programmable ROM (PROM), an electrically programmable ROM (EPROM), an electrically erasable ROM (EEPROM), a flash memory, and the like. The storage unit 940 may include a nonvolatile medium such as a hard disk drive (HDD), a solid state disk (SSD), an embedded multimedia card (eMMC), or a universal flash storage (UFS). The storage unit 940 may be operatively coupled to the processor 910.

Figure 10:
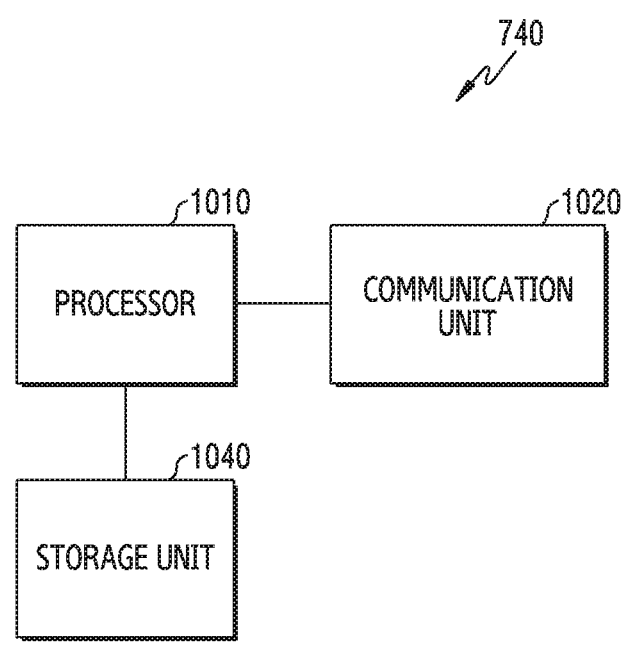
FIG. 10 is a block diagram of a server device in a communication system according to various embodiments of the disclosure.

FIG. 10 is a block diagram of a server device 740 in a communication system according to various embodiments of the disclosure. As used herein, the term " . . . unit" or "-er" refers to a unit entity configured to process at least one function or operation, and may be implemented as hardware, software, or a combination of hardware and software.

Referring to FIG. 8, the server device 740 may include a processor 2010, a communication unit 1020, and a storage unit 1040.

The processor 1010 may control overall operations of the server device 740. For example, the processor 1010 may transmit or receive a signal through the communication unit 1020. The processor 1010 may record data in the storage unit 1040, and may read data stored in the storage unit 1040. To this end, the processor 1010 may include at least one processor or at least one microprocessor. The processor 1010 may be configured to implement operating procedures and/or methods of the server device 740 proposed in the disclosure. The processor 1010 may control the server device 740 so as to perform operations related to network quality management according to various embodiments described later.

The communication unit 1020 may perform functions for transmitting or receiving a signal through a wireless channel. The communication unit 1020 may perform a function for conversion between a baseband signal and a bit string according to the physical layer specification of the system. For example, when transmitting data, the communication unit 1020 may generate complex symbols by encoding and modulating a transmission bit string. As another example, when receiving data, the communication unit 1020 may restore a reception bit string by demodulating and decoding a baseband signal.

The communication unit 1020 is configured to provide an interface for performing communication with other nodes in the network. That is, the communication unit 1020 converts a bit string transmitted from the server device 740 to another node (for example, base station, core network, or authentication server) into a physical signal, and converts a physical signal received from the other node into a bit string. That is, the communication unit 1020 may transmit and receive signals. Accordingly, the communication unit 1020 may be referred to as a transmitting unit, a receiving unit, or a transmitting/receiving unit.

The communication unit 1020 is configured to enable the server device 740 to communicate with other devices or the system via backhaul connection or via the network. The communication unit 1020 may support communication via appropriate wired or wireless connection. For example, when the server device 740 is implemented as a part of a mobile communication system (such as one supporting 5G, LTE, or LTE-A), the communication unit 1020 may enable the server device 740 to communicate with other devices via wired or wireless backhaul connection. When the server device 740 is implemented as an access point, the communication unit 1020 may enable the server device 740 to communicate via a wired or wireless near-field network, or to communicate with a network having a larger scale (such as the Internet) via wired or wireless connection. The communication unit 1020 may include a structure for supporting communication via wired or wireless connection, such as Ethernet or RF transceiver.

The storage unit 1040 may store a control instruction code for controlling the server device 740, control data, or user data. For example, the storage unit 1040 may include an application, an operating system (OS), middleware, and a device driver. The storage unit 1040 may include at least one of a volatile memory or a nonvolatile memory. The volatile memory may include a dynamic RAM (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), and the like. The nonvolatile memory may include a read only memory (ROM), a programmable ROM (PROM), an electrically programmable ROM (EPROM), an electrically erasable ROM (EEPROM), a flash memory, and the like. The storage unit 1040 may include a nonvolatile medium such as a hard disk drive (HDD), a solid state disk (SSD), an embedded multimedia card (eMMC), or a universal flash storage (UFS). The storage unit 1040 may be operatively coupled to the processor 1010.

Figure 11:
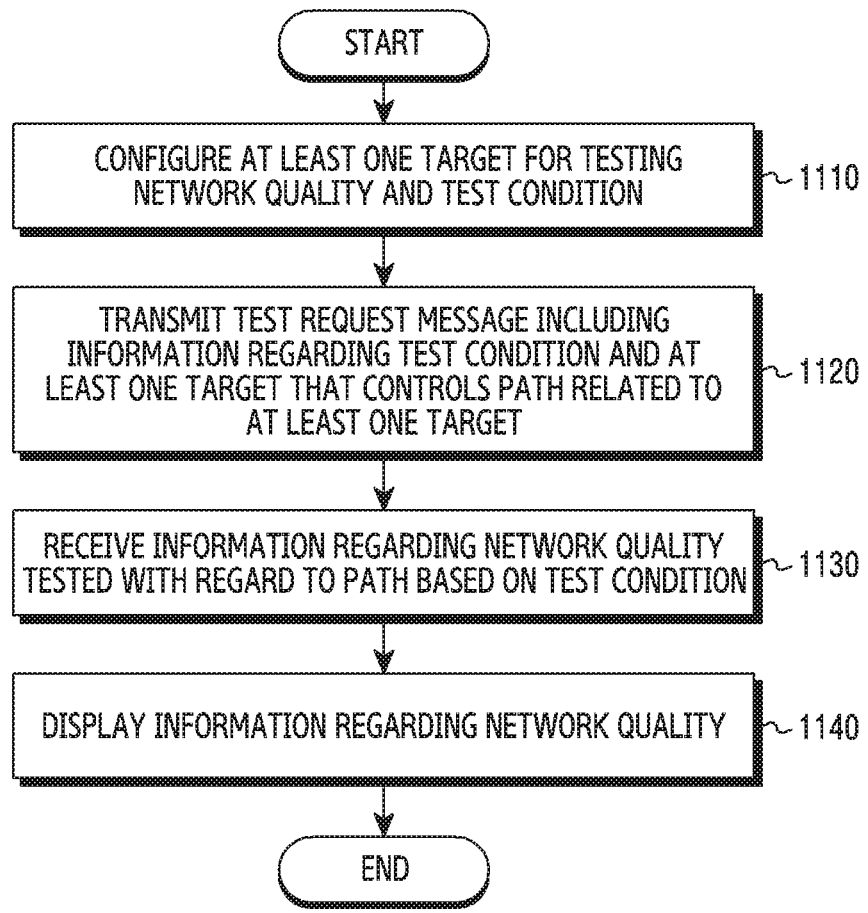
FIG. 11 is an operation flowchart of a management device in a communication system according to various embodiments.

FIG. 11 is an operation flowchart of a management device 710 in a communication system according to various embodiments. FIG. 11 illustrates an exemplary operating method of a management device 710.

Referring to FIG. 11, in step 1110, the management device 710 configures at least one target for measuring network quality and a test condition. The management device 710 may configure at least one target for measuring network quality and a test condition. The at least one target may include a source target and a destination target. In addition, the at least one target may be a virtual device (for example, VM or virtual switch), or may be a physical device (for example, spine switch or leaf switch).

In step 1120, the management device 710 transmits a measurement request message including information regarding the at least one target and the test condition. The management device 710 may transmit a measurement request message including information regarding the at least one target and the test condition. For example, the management device 710 may transmit a measurement request message including information regarding the at least one target and the test condition to a controller device that controls a path related to the at least one target.

In step 1130, the management device 710 receives information regarding network quality measured with regard to the path, based on the test condition. The management device 710 may receive information regarding network quality measured with regard to the path, based on the test condition. The information regarding network quality may be measured with regard to a path between the source target and the destination target. In addition, the information regarding network quality may include at least one of the address of each of at least one target, information regarding a path between two targets included in the at least one target, information regarding a change in network quality over time, and statistical information regarding the network quality. Furthermore, the information regarding network quality may include an index for indicating network quality regarding the path between the source target and the destination target, and index values. For example, the index for indicating network quality may include at least one of the bandwidth regarding the packet transmitted/received between the two targets, delay, jitter, loss, loss ratio, MOS, PPS, the amount of packets, and information regarding the packet size.

In step 1140, the management device 710 displays information regarding network quality. The display 810 of the management device 710 may display the information regarding network quality. For example, the information regarding network quality may be displayed through a UI as illustrated in FIG. 23A to FIG. 23F.

Figure 12:
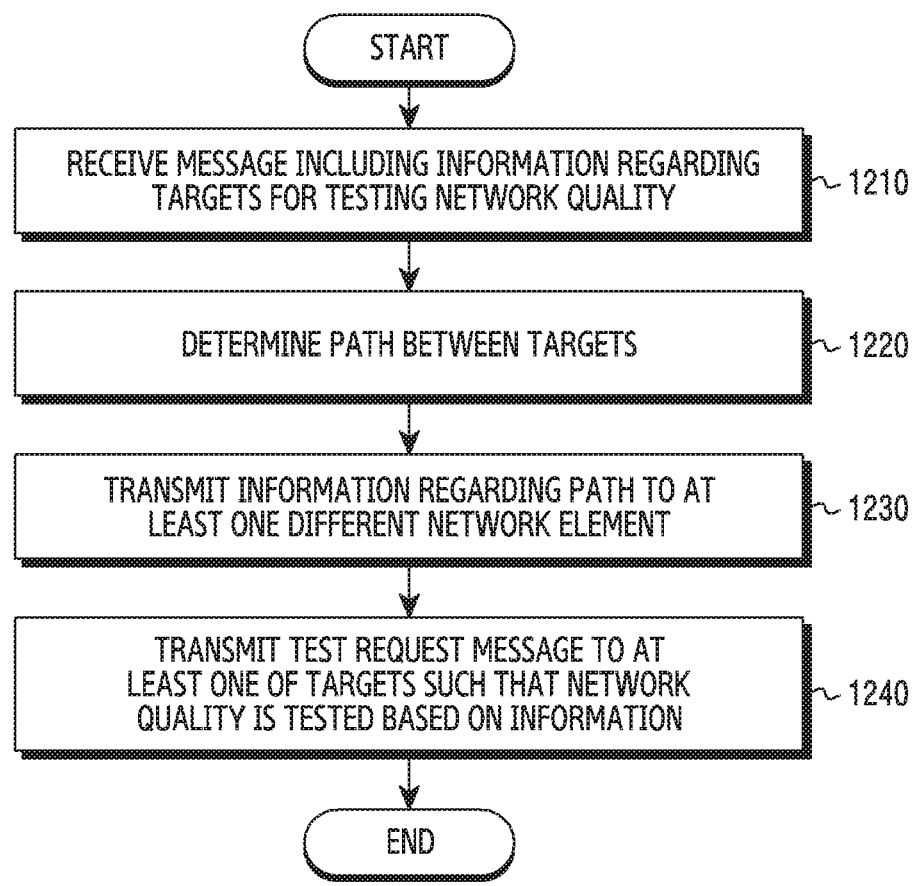
FIG. 12 is an operation flowchart of a controller device in a communication system according to various embodiments.

FIG. 12 is an operation flowchart of a controller device 720 in a communication system according to various embodiments of the disclosure.

Referring to FIG. 12, in step 1210, the controller device 720 receives a message including information regarding targets for measuring network quality. The controller device 720 may receive a message including information regarding targets for measuring network quality.

In step 1220, the controller device 720 configures a path between the targets. The controller device 720 may configure a path between the targets. In this regard, the controller device 720 may configure a path by using SDN technology. To this end, although not illustrated, the controller device 720 may generate a first flow path regarding the configured path. The first flow path may be configured such that, when a corresponding NE has received a test packet transmitted along the path, another NE on the path, to which the test packet is to be transmitted, can be indicated.

In step 1230, the controller device 720 transmits information regarding the path to at least one different NE. The controller device 720 may transmit information regarding the path to at least one different NE. The at least one different NE is an NE constituting the path, and may include at least one of a virtual switch, a physical switch, and a DCI. The information regarding the path may include the first flow rule.

In step 1240, the controller device 720 transmits a measurement request message to at least one of the targets such that network quality is measured based on the information. The communication unit 920 of the controller device 720 may transmit a measurement request message to at least one of the targets such that network quality is measured based on the information through the communication unit 920. For example, among the targets that have received the measurement request message, the source target may generate a test packet and may transmit the generated test packet to the destination target along the information indicated by the first flow rule included in the information. In addition, the measurement request message may include a test condition for testing network quality. In order to test network quality, the destination target that has received the test packet may perform a process corresponding to the test condition with regard to the test packet, and may transmit the processed packet back to the source target. In other words, network quality regarding the source target and the destination target may be measured based on the test condition.

Figure 13A:
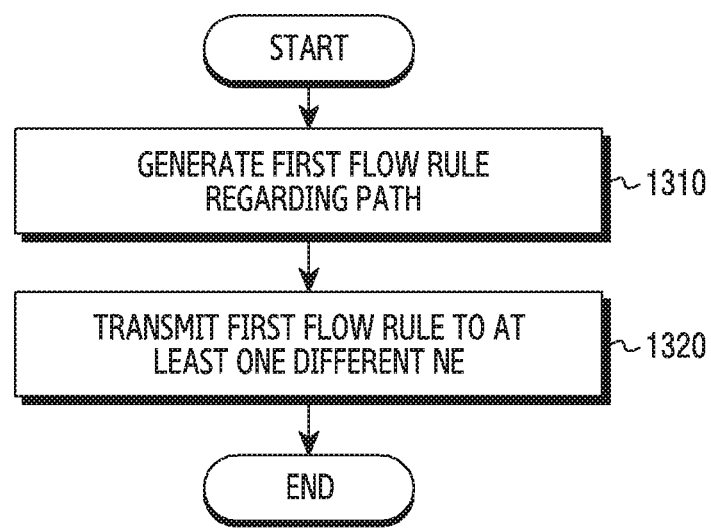
FIG. 13A to FIG. 13B are flowcharts illustrating operations related to a flow rule performed by a controller device in a communication system according to various embodiments of the disclosure, respectively.

FIG. 13A is a flowchart illustrating operations related to a first flow rule performed by a controller device 720 according to various embodiments of the disclosure.

Referring to FIG. 13A, in step 1310, the controller device 720 generates a first flow rule regarding a path. The processor 910 of the controller device 720 may generate a first flow rule regarding a path. The first flow rule may be configured such that, when an NE has received a test packet transmitted along the path, another NE on the path, to which the test packet is to be transmitted, is indicated to the NE.

In step 1320, the controller device 720 transmits the first flow rule to at least one different NE. The communication unit 920 of the controller device 720 transmits the first flow rule to at least one different NE through the communication unit 920. The at least one different NE may be an NE constituting the path. Therefore, the test packet generated by the source target may be transmitted to the destination target through at least one NE on the path indicated by the first flow rule, and the packet transmitted by the destination target may be received by the source target through at least one NE on the path indicated by the first flow rule.

Figure 13B:
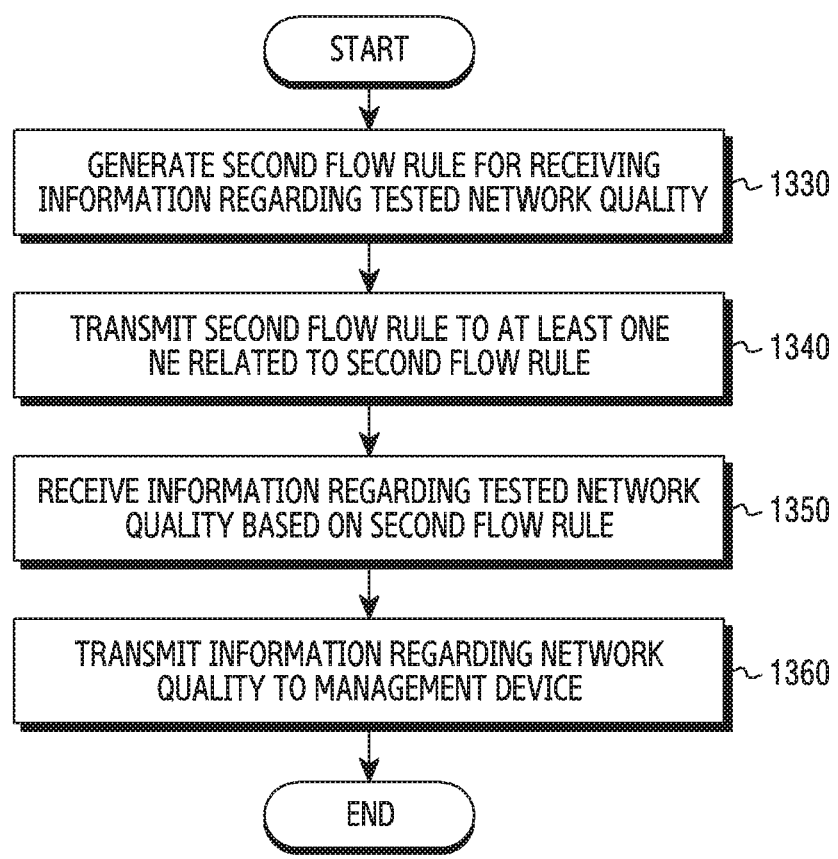

FIG. 13B is a flowchart illustrating operations related to a second flow rule performed by a controller device 720 according to various embodiments of the disclosure.

Referring to FIG. 13B, in step 1330, the controller device 720 generates a second flow rule for receiving information regarding measured network quality. The processor 910 of the controller device 720 may generate a second flow rule for receiving information regarding measured network quality. The second flow rule may be configured such that, when an NE has received information regarding network quality transmitted along a reception path, another NE on the reception path, to which the information regarding network quality is to be transmitted, is indicated to the NE. The reception path may be a path along which the information regarding network quality is received by the management device 710.

In step 1340, the controller device 720 transmits the second flow rule to at least one NE related to the second flow rule. The communication unit 920 of the controller device 720 may transmit the second flow rule to at least one NE related to the second flow rule through the communication unit 920. The at least one NE may be an NE constituting the reception path.

In step 1350, the controller device 720 receives information regarding measured network quality, based on the second flow rule. The communication unit 920 of the controller device 720 may receive information regarding measured network quality, based on the second flow rule, through the communication unit 920. The controller device 720 receives information regarding network quality from the source target, and the information regarding network quality is received along the reception path indicated by the second flow rule.

In step 1360, the controller device 720 transmits information regarding network quality to the management device 710. The communication unit 920 of the controller device 720 may transmit information regarding network quality to the management device 710 through the communication unit 920. The management device 710 may display the information regarding network quality in response thereto.

Figure 14:
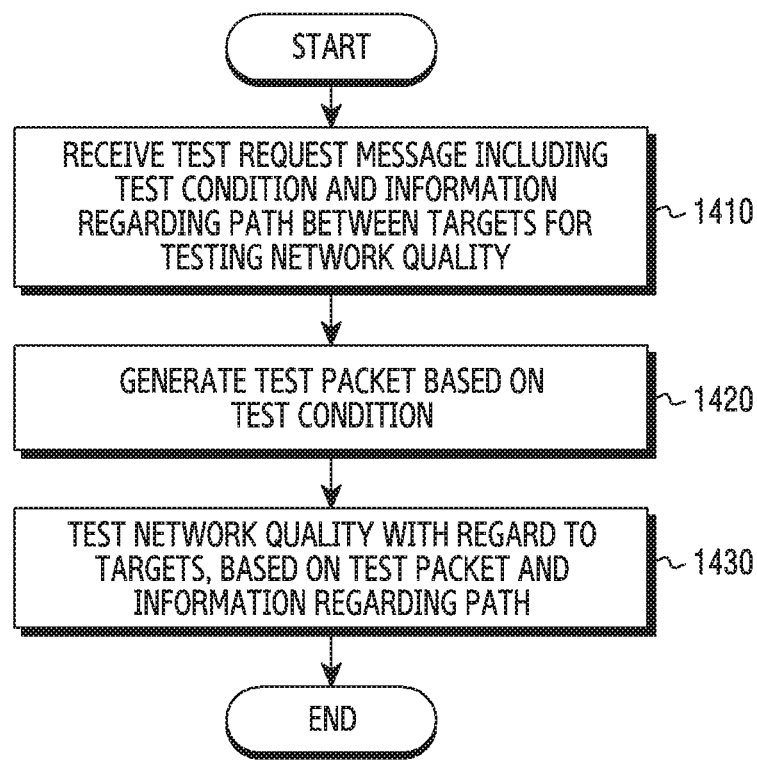
FIG. 14 is an operation flowchart of a server device in a communication system according to various embodiments of the disclosure.

FIG. 14 is an operation flowchart of a server device 740 according to various embodiments of the disclosure.

Referring to FIG. 14, in step 1410, the server device 740 receives a measurement request message including a test condition and information regarding a path between targets for measuring network quality. The communication unit 1020 of the server device 740 may receive a measurement request message including a test condition and information regarding a path between targets for measuring network quality through a backhaul 1030. The management device 710 may determine the targets and the test condition, may provide the targets and the test condition to the controller device 720, and the server device 740 may receive, from the controller device 720, the test condition and information regarding the path determined by the controller device 720. The information regarding the path may include a first flow rule regarding the path. The first flow rule may be configured such that, when an NE has received a transmission packet transmitted along the path, another NE on the path, to which the test packet is to be transmitted, is indicated to the NE.

Although not illustrated, the server device 740 may install the first flow rule. For example, the server device 740 may store the first flow rule in the storage unit 1040. In addition, the server device 740 may generate a second flow rule for transmitting information regarding measured network quality. The second flow rule may be configured such that, when an NE has received information regarding network quality transmitted along the reception path, another NE on the path, to which the information regarding network quality is to be transmitted, is indicated to the NE. The reception path may be a path along which information regarding network quality is received by the management device 710. The server device 740 may install the second flow rule. For example, the server device 740 may store the second flow rule in the storage unit 1040.

In step 1420, the server device 740 generates a test packet, based on the test condition. The processor 1010 of the server device 740 may generate a test packet, based on the test condition. The test packet may be used to test network quality regarding the path between the source target and the destination target.

In step 1430, the server device 740 measures network quality with regard to the targets, based on the path-related information and the test packet. The processor 1010 of the server device 740 may test network quality with regard to the targets, based on the path-related information and the test packet. In order to measure network quality, the source target of the server device 740 may transmit a test packet to the destination target among the targets, based on the path-related information, in order to measure network quality, and the destination target may perform a process corresponding to the test condition with regard to the test packet received from the source target. The source target may receive the processed test packet from the destination target, based on the path-related information, may analyze the processed test packet, and may generate information regarding network quality. The server device 740 may transmit information regarding network quality to the controller device 720, based on the second flow rule. The server device 740 may transmit information regarding network quality to the management device 710 along the path indicated by the second flow rule.

Figure 15:
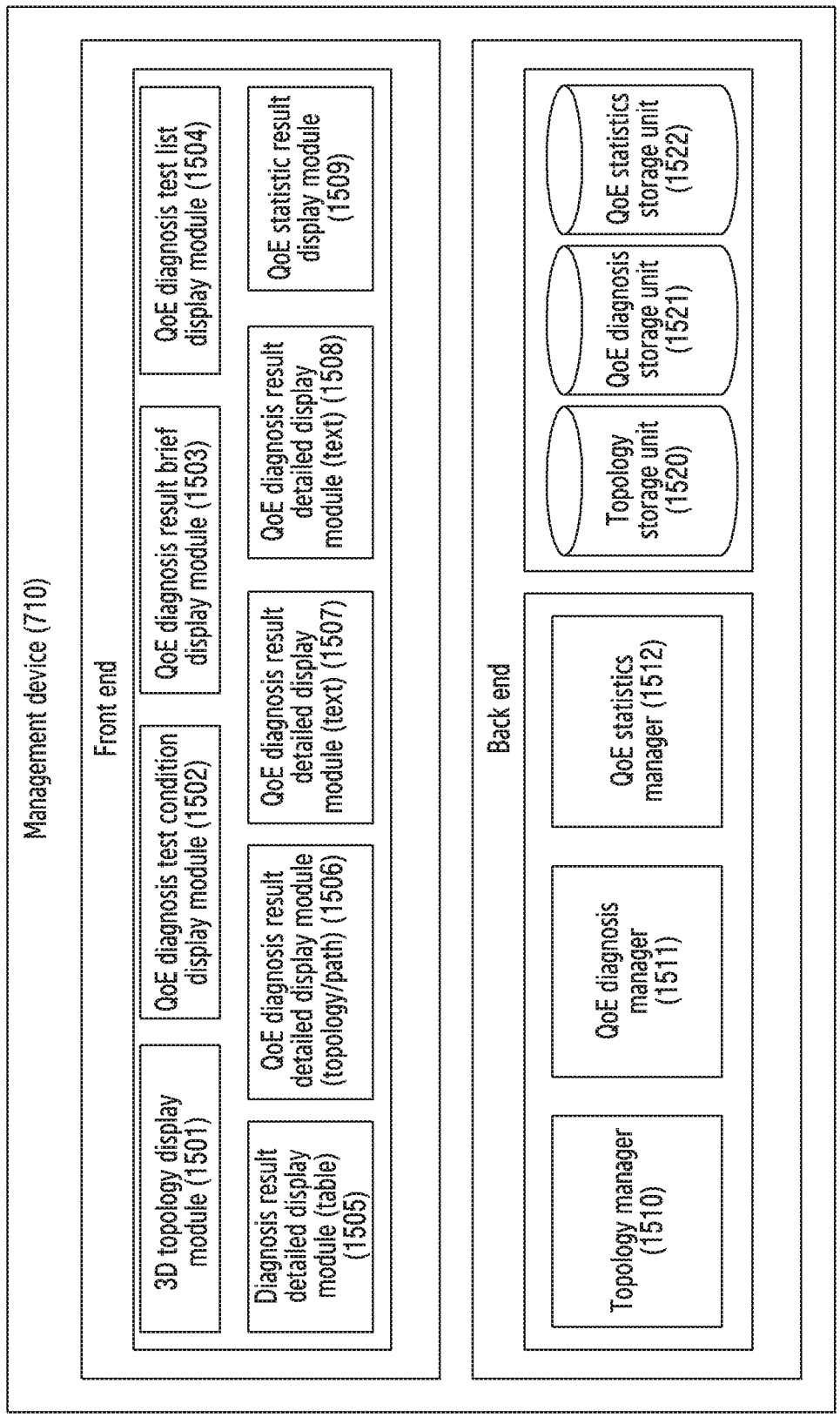
FIG. 15 illustrates functional modules of an SDN management device in a communication system according to various embodiments of the disclosure.

FIG. 15 illustrates functional modules of a management device 701 according to various embodiments of the disclosure. The functional modules illustrated in block shapes in FIG. 15 may be physical devices, or may refer to logical entities implemented by software. In addition, the functional modules of the management device 710 may be controlled by the processor 820 of the management device 710.

The 3D topology display module 1501 may display a UI for inputting information regarding a test condition and measure targets as illustrated in FIG. 23A to FIG. 23F. In addition, the 3D topology display module 1501 may display a UI indicating information regarding the result of quality test.

The QoE diagnosis test condition display module 1502 may provide a UI for enabling the user to configure a test condition. The QoE diagnosis result brief display module 1503 may provide a UI for displaying information regarding the result of measured network quality. The QoE diagnosis test list display module 1504 may display multiple results of network quality measurements performed by the management device 710 according to the index.

The QoE diagnosis result detailed display module (table) 1505 may display multiple results of network quality measurements in a table type. The QoE diagnosis result detailed display module (topology/path) 1506 may display information regarding a test condition (for example, protocol) used to measure network quality, and information for visually indicating the path between measurement targets. The QoE diagnosis result detailed display module (chart) 1507 may display multiple results of network quality measurements in a chart type. The QoE diagnosis result detailed display module (text) 1505 may display the result of analyzing network quality measured with regard to specific targets in detail as a text. The QoE statistic result display module 1509 may display an aspect of the change in network quality measured with regard to specific targets over time.

The topology manager 1510 may control and manage topologies related to the network quality measurements. The QoE diagnosis manager 1511 may generate a message including information regarding a network quality measurement target and a test condition, and may transmit the message to another device. In addition, the QoE diagnosis manager 1511 may cause the display 810 of the management device 710 to display information regarding the result of measured network quality. The QoE statistics manager 1512 may process statistic information regarding multiple results of network quality measurements, and may cause the display 810 of the management device 710 to display the same.

The QoE statistics manager 1512 may analyze and manage statistic materials acquired from multiple results of network quality measurements. The QoE diagnosis storage unit 1521 may store the results of network quality measurements. The QoE statistics storage unit 1522 may store statistic materials regarding network quality measured with regard to specific targets over time.

Figure 16:
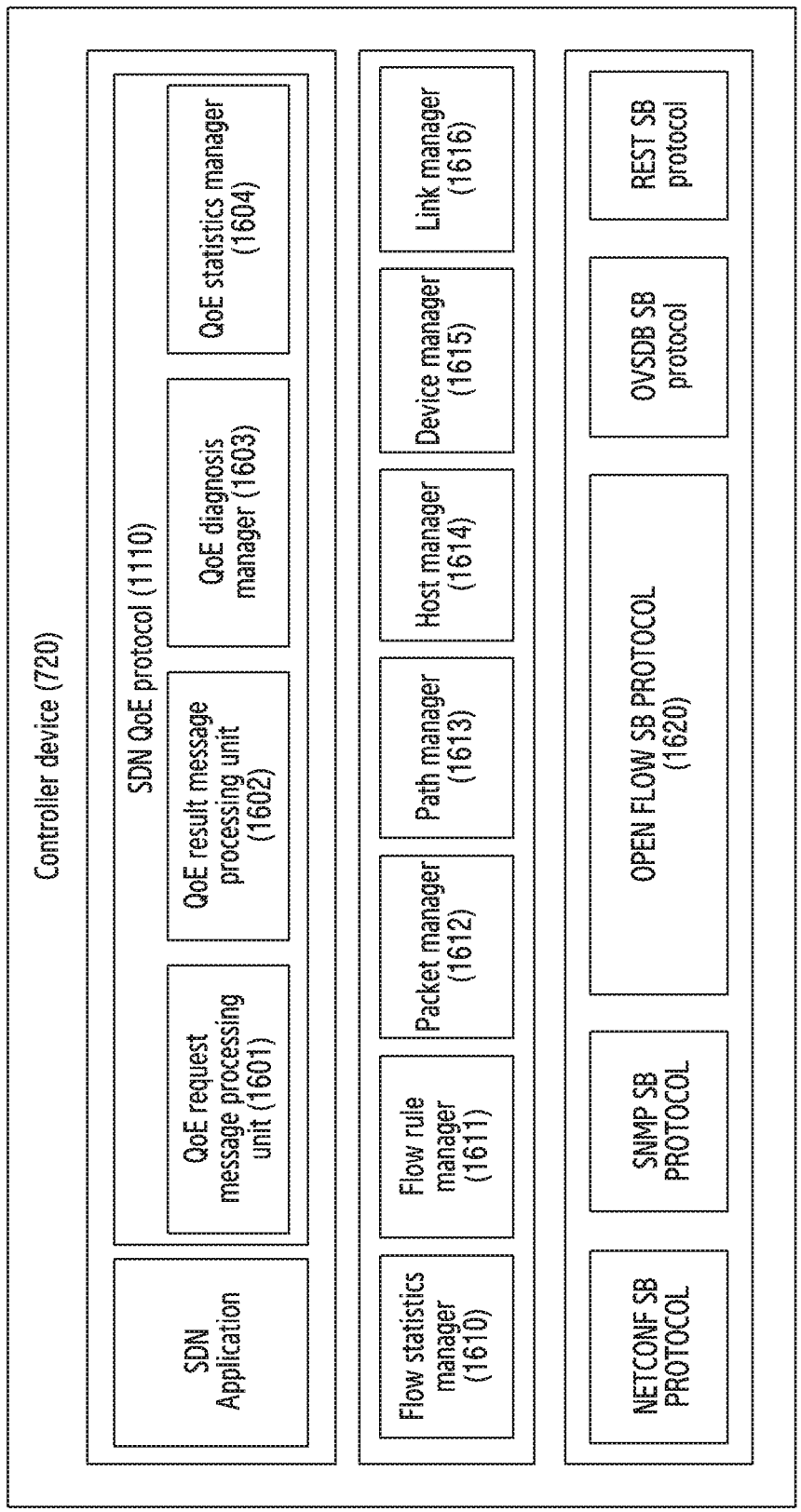
FIG. 16 illustrates functional modules of an SDN controller device in a communication system according to various embodiments of the disclosure.

FIG. 16 illustrates functional modules of an SDN controller device 720 according to various embodiments of the disclosure. The functional modules illustrated in block shapes in FIG. 16 may be physical devices, or may refer to logical entities implemented by software. Alternatively, the functional modules of the controller device 720 may be controlled by the processor 910 of the controller device 720.

The QoE request message processing unit 1601 may receive a diagnosis request message including a measurement target and a test condition through an API. In addition, the QoE request message processing unit 1601 may parse the received diagnosis request message, thereby identifying the measurement target and the test condition included in the diagnosis request message, and may deliver information regarding the identified measurement target and test condition to the QoE diagnosis manager 1603.

The QoE result message processing unit 1602 may receive a message including information regarding the result of measured network quality through the API. In addition, the QoE result message processing unit 1602 may parse the message and may transmit information regarding the identified result of network quality to the management device 710.

The QoE diagnosis manager 1603 may control such that a message for requesting a network quality measurement or a result of measured network quality is encoded, the encoded message is transmitted to another device. In addition, the QoE diagnosis manager 1603 may generate a flow rule regarding the path between measurement targets. The QoE statistics manager 1604 may control such that statistic information regarding multiple pieces of network quality information is encoded, and the encoded message is transmitted to another device.

The flow statistics manager 1611 may control such that statistic materials regarding the path for which network quality is measured are generated, and the generated materials are transmitted to another device. The flow rule manger 1611 may receive a flow rule from the QoE diagnosis manager 1603. In addition, the flow rule manager 1611 may encode the received flow rule in a message format.

The packet manager 1612 may encode a packet related to the network quality measurement, and may transmit the encoded packet to another device. The path manager 1613 may configure a path for test packet transmission between measurement targets (source target and destination target) under the control of the QoE diagnosis manager 1603. The host manager 1614 may determine the network addresses of the measurement targets and the positions of the measurement targets corresponding to the addresses on the network, under the control of the QoE diagnosis manager 1603.

The device manager 1615 may control and manage physical constituent elements and/or logical modules of the controller device 720. The link manager 1616 may transmit a message to another device or may measure and manage the quality of a link for receiving a message from another device.

The open flow SB protocol 1620 may transmit a message or a packet to another device. Besides, the controller device 720 may include protocols such as an NETCONF SB protocol, an SNMP SB protocol, an OVSDB SB protocol, and an REST SB protocol.

Figure 17:
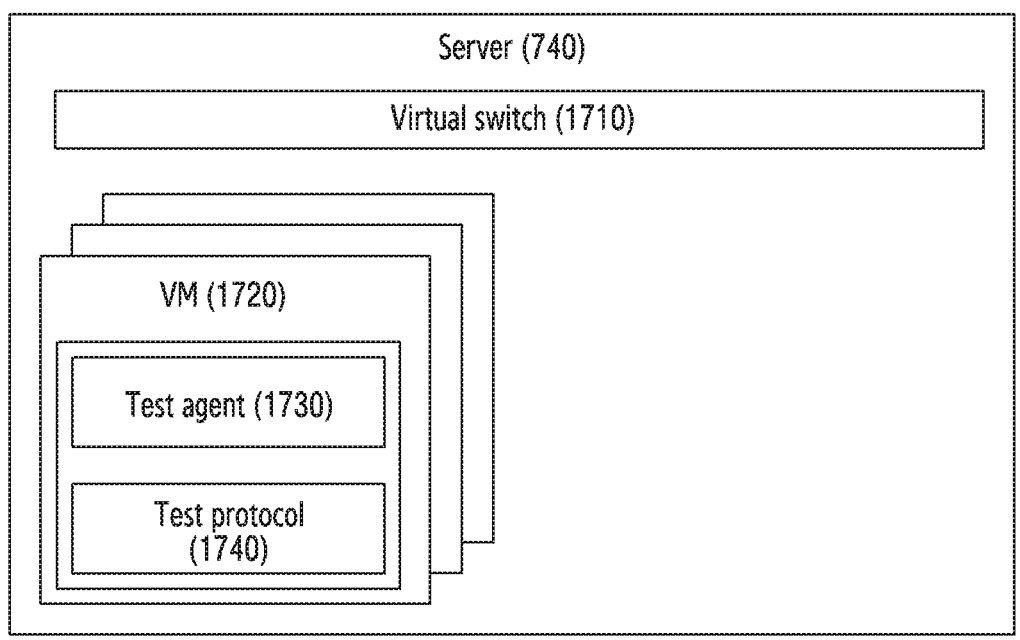
FIG. 17 illustrates functional modules of a server device in a communication system according to various embodiments of the disclosure.

FIG. 17 illustrates functional modules of a server device 740 according to various embodiments of the disclosure. The functional modules illustrated in block shapes in FIG. 17 may be physical devices, or may refer to logical entities implemented by software. In addition, the functional modules of the server device 740 may be controlled by the processor 1020 of the server device 740.

The virtual switch 1710 may control such that a packet or data received by the virtual switch 1710 is transmitted through an appropriate path. The VM 1720 may perform operations of receiving a message requesting a network quality measurement, and measuring the network quality with other VMs 332-339 in response to the message. The VM 1720 may include a test agent 1730 and a test protocol 1740. The detailed configuration of the VM 1720 will be described later in more detail with reference to FIG. 18.

Figure 18:
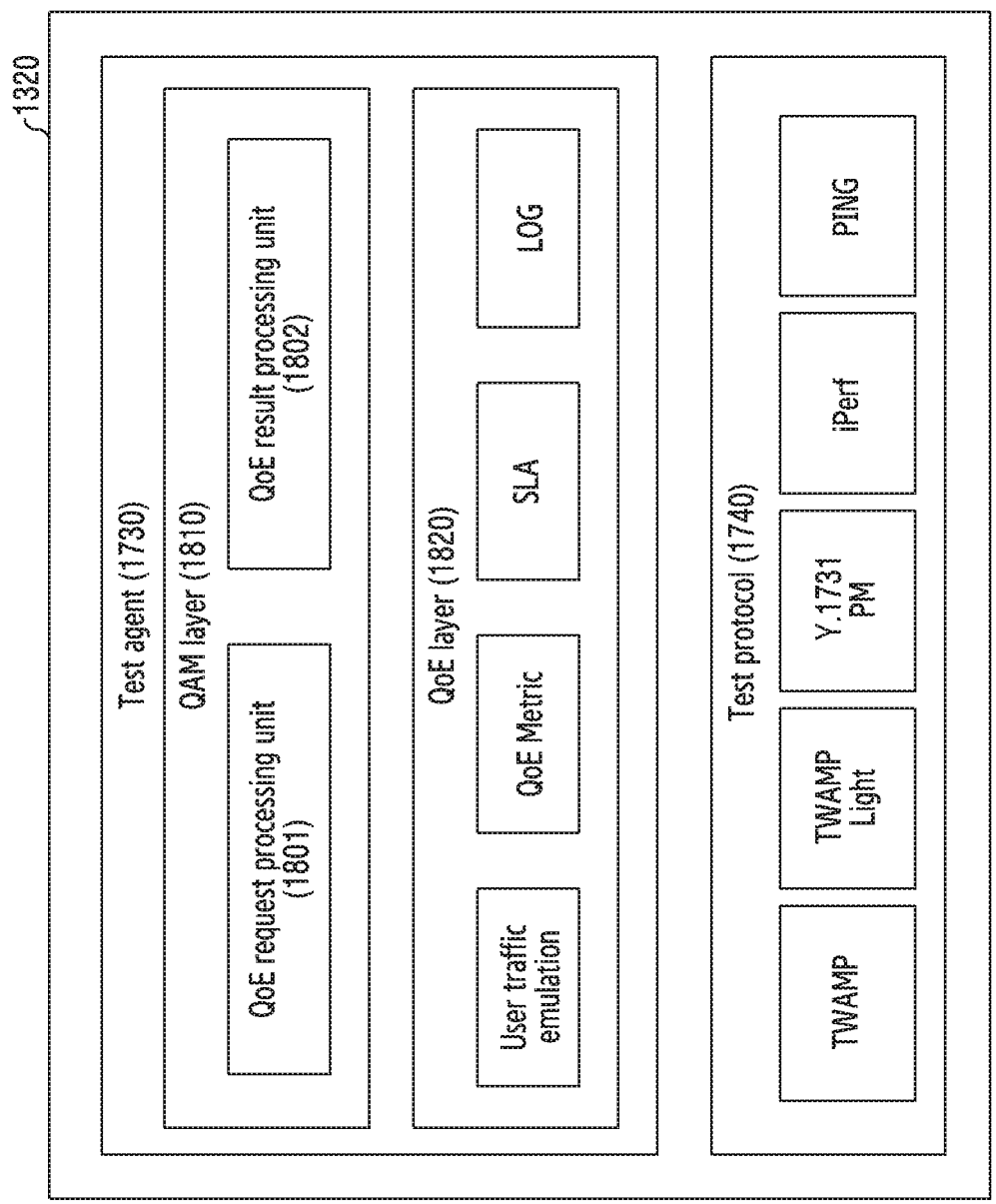
FIG. 18 illustrates functional modules of a virtual machine (VM) in a communication system according to various embodiments of the disclosure.

FIG. 18 illustrates functional modules of the VM 1720 according to various embodiments of the disclosure. The functional modules illustrated in block shapes in FIG. 18 may be physical devices, or may refer to logical entities implemented by software.

The quality assurance manager (QAM) layer 1810 of the test agent 1730 may include a QoE request processing unit 1801 and a QoE result processing unit 1802. The QoE request processing unit 1801 may receive a packet including a test condition and information regarding a destination target from the virtual switch 1710, and may parse the packet received from the virtual switch 1710, thereby identifying the destination target and the test condition. As a result thereof, the VM 1720 may test network quality with regard to the destination target based on the test condition. The QoE result processing unit 1802 may receive a packet processed by the destination target from the virtual switch 1710, and may generate information regarding the result of network quality.

The QoE layer 1820 of the test agent 1730 may include a user traffic emulation, a QoE metric, a service level agreement (SLA), and a log. The test protocol 1740 is a protocol used to test network quality, and may include TWAMP, TWAMP light, Y.1731PM, iPerf, PING.

Figure 19:
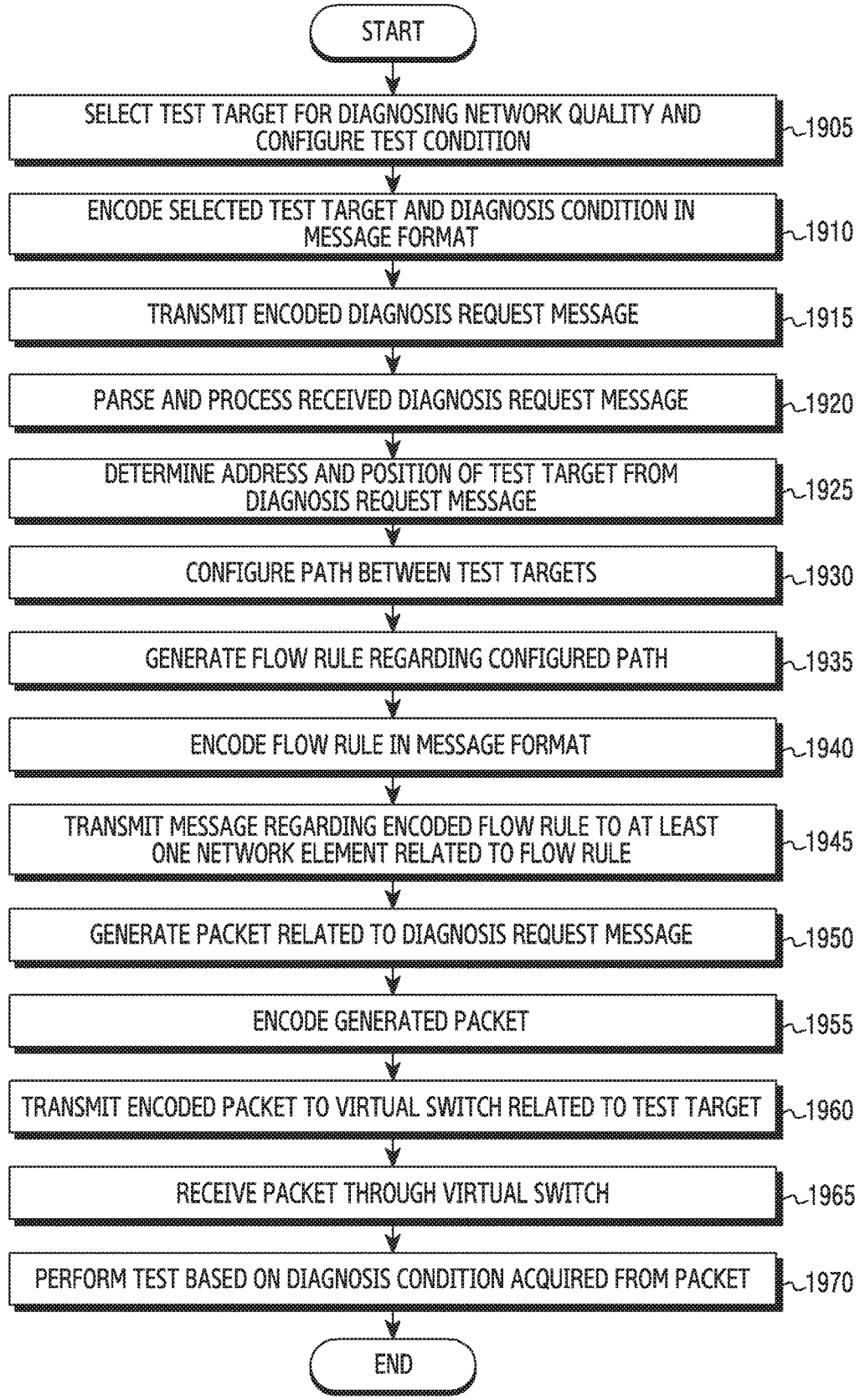
FIG. 19 is a flowchart of operations for requesting a network quality test in a communication system according to various embodiments of the disclosure.

FIG. 19 is a flowchart of operations for requesting a network quality test according to various embodiments of the disclosure.

Referring to FIG. 19, in step 1905, the management device 710 selects a test target for testing network quality, and configures a test condition. The I/O 860 of the management device 710 may receive an input for selecting the test target and an input for configuring the test condition. The user may select the test target through the 3D topology display module 1501 of the management device 710, and may configure the test condition through the QoE diagnosis test condition display module 1502.

In step 1910, the management device 710 encodes the selected test target and the test condition in a message format, and generates a diagnosis request message. The processor 820 of the management device 710 may encode the selected test target and the test condition in a message format. The selected test target and the test condition may be delivered to the QoE diagnosis manager 1511 of the management device 710, and may be encoded in a message format such that the same is delivered to the SDN QoE application 1610 of the controller device 720. According to various embodiments of the disclosure, the diagnosis request message may include content as given in Table 1 below:

TABLE 1

Test Request
1. Test Condition Common unit
    Test ID
    Source Target ID
    Source Target address (Mac Address IP address)
    Destination Target ID
    Destination Target Address (Mac Address / IP Address)
    Operation (Start/Stop)
    Test protocols (TWAMP /TWAMP Light / Y.1731 PM / PING /
    iPerf / etc.
    Test termination condition (Test execution duration / the number of
test packets / test termination time)
        Periodic Analysis report interval
        User Traffic Emulation (use/no use)
        Service Type (Voice / Video)
        Sub Type (VoLTE, Wideband Audio / VoIP / RTP video)
        Sub Type Option (AMR_WB_23_85 / AMR_WB_15_85 /
AMR_WB_12_65 / AMR_12_20 / G711_64KBPS /
H264_360P_30FPS / H264_720P_30FPS/ H264_1280P_30FPS
    Test Packet Size
    Test Packet Interval
    Bit per second
    Packet per second
2. Test Condition Variable unit
    DSCP (Test)
    Source Test Port
    Destination Test Port
    Destination Control Port
    DSCP (Test)
    Source Test Port
    Destination Test Port
    DSCP (Test)
    Source Test Port
    Destination Test Port
    whether VLAN is tagged or not (tagged / untagged)
    VLAN ID
    CoS In step 1915, the management device 710 transmits the encoded diagnosis request message. The communication unit 830 of the management device 710 may transmit the encoded diagnosis request message through a backhaul 840. The QoE request message processing unit 1601 of the SDN QoE application 1610 of the controller device 720 may receive the encoded diagnosis request message through the API.

In step 1920, the controller device 720 parses and processes the received diagnosis request message. The processor 910 of the controller device 720 may parse and process the received diagnosis request message. The QoE request message processing unit 1601 of the controller device 720 may parse the received diagnosis request message, thereby identifying the test target and the test condition included in the diagnosis request message, and may deliver information regarding the identified test target and the test condition to the QoE diagnosis manager 1603.

In step 1925, the controller device 720 determines the address and position of the test target from the diagnosis request message. The processor 910 of the controller device 720 may determine the address and position of the test target from the diagnosis request message. The QoE diagnosis manager 1603 of the controller device 720 may determine the network address of the test target and the position of the test target corresponding to the address on the network, with reference to the delivered information regarding the test target, by using the host manager 1614.

In step 1930, the controller device 720 configures a path between test targets. The processor 910 of the controller device 720 may configure a path between test targets. The QoE diagnosis manager 1603 of the controller device 720 may configure a path for test packet transmission between test targets (source target and destination target) by using the path manager 1613.

In step 1935, the controller device 720 generates a flow rule regarding the configured path. The processor 910 of the controller device 710 may generate a flow rule regarding the configured path. The flue rule may be configured such that, when an NE has received a packet, another NE, to which the NE needs to deliver the received packet, is indicated. According to various embodiments of the disclosure, the NE may store at least one flow rule, and the packet may include information regarding a preconfigured flow rule. A step of flow rules stored in the NE may be referred to as "a flow table". Accordingly, after receiving a packet including information regarding a flow rule, an NE may identify the flow rule corresponding to the packet in the flow table, based on the information regarding the flow rule, and may transmit the packet to another NE indicated by the flow rule.

According to various embodiments of the disclosure, the controller device 720 may generate not only a flow rule regarding a configured path, but also a flow rule for receiving the result of measured network quality from the source target. The processor 910 of the controller device 710 may generate a flow rule for receiving the result of measured network quality from the source target. The flow rule for receiving the result of measured network quality from the source target may refer to a flow rule regarding the path between the source target and the management device 710. The QoE diagnosis manager 1603 of the controller device 720 may generate a flow rule regarding a path, may generate a flow rule for receiving the result of measured network quality from the source target, and may transmit the generated flow rules to the flow rule manager 1611.

In step 1940, the controller device 720 encodes the generated flow rule in a message format. The processor 910 of the controller device 720 may encode the generated flow rule in a message format. The flow rule manager 1611 may encode the flow rule received from the QoE diagnosis manager 1603 in an open flow message format through the open flow SB protocol 1620.

In step 1945, the controller device 720 transmits a message regarding the encoded flow rule to at least one NE related to the flow rule. The processor 910 of the controller device 720 may transmit a message regarding the flow rule to at least one NE related to the flow rule. The open flow SB protocol 1620 of the controller device 720 may transmit a message regarding the encoded flow rule to at least one NE related to the flow rule, and the at least one NE that has received the message regarding the flow rule may store the corresponding flow rule. For example, when a flow rule has been generated with regard to a path between the source target and the destination garget "first VNF (source target)-> first OVS->first leaf->second spine->third leaf->third OVS->sixth VNF (destination target)" as in the first test case 510 of FIG. 5, the controller device 420 may transmit the flow rule to each of the first OVS, the first leaf, the second spine, the third leaf, and the third OVS related to the flow rule. Accordingly, when the first leaf has received a test packet from the first OVS, the first leaf may deliver the received test packet to the second spine according to the flow rule, and, on the other hand, when the first leaf has received a packet that has undergone a process corresponding to the test condition from the second spine, the first leaf may deliver the processed packet to the first OVS according to the flow rule. In addition, the controller device 720 may transmit information regarding the flow rule related to the path between the management device 710 and the source target to at least one NE related to the flow rule such that the management device 710 receives information regarding the result of measured network quality from the source target.

In step 1950, the controller device 720 generates a packet related to the diagnosis request message. The processor 910 of the controller device 720 may generate a packet related to the diagnosis request message. As given in Table 1 above, the packet related to the diagnosis request message may include information regarding test targets (source and destination) and information regarding the test condition, and may further include information regarding the flow rule generated in step 1935. The QoE diagnosis manager 1603 may convert the diagnosis request message in a packet format, in order to transmit the diagnosis request message to at least one source target and destination target. The QoE diagnosis manager 1603 may transmit the diagnosis request message in the packet format to at least one source target and destination target through the packet manager 1612.

In step 1955, the controller device 720 encodes the generated packet. The processor 910 of the controller device 720 may encode the generated packet. The packet manager 1612 may encode the packet in order to transmit the generated packet to a virtual switch directly connected to the source target and to a virtual switch directly connected to the destination target.

In step 1960, the controller device 720 transmits the encoded packet to a virtual switch related to the test target. The processor 910 of the controller device 720 may transmit the encoded packet to a virtual switch related to the test target. In other words, the controller device 720 may transmit the encoded packet to at least one of a virtual switch directly connected to the source target and a virtual switch directly connected to the destination target. The encoded packet may include an indicator configured such that the packet is appropriately received by the source target or the destination garget from the virtual switch. The open flow SB protocol 1620 of the controller device 720 may receive the encoded packet from the packet manager 1612, and may transmit the encoded packet to at least one of the virtual switch directly connected to the source target and the virtual switch directly connected to the destination target.

In step 1965, the server device 740 receives a packet through a virtual switch. The communication unit 1020 of the server device 740 may receive a packet from the controller device 720 through a backhaul 1030. The virtual switch 1710 of the server device 740 may identify a source target or a destination target, to which the packet is to be transmitted, from the identifier included in the packet, and may transmit the packet to the identified source target or destination target. The test agent 1730 of the source target or the destination target may receive the packet from the virtual switch 1710.

In step 1970, the server device 740 may perform an operation for testing network quality, based on the diagnosis condition acquired from the packet. The processor 1010 of the server device 740 may perform an operation for testing network quality, based on the diagnosis condition acquired from the packet. The test agent 1730 may parse the packet received from the virtual switch 1710, thereby identifying the diagnosis condition and the destination target, and may measure the network quality with regard to the destination target based on the diagnosis condition.

Figure 20:
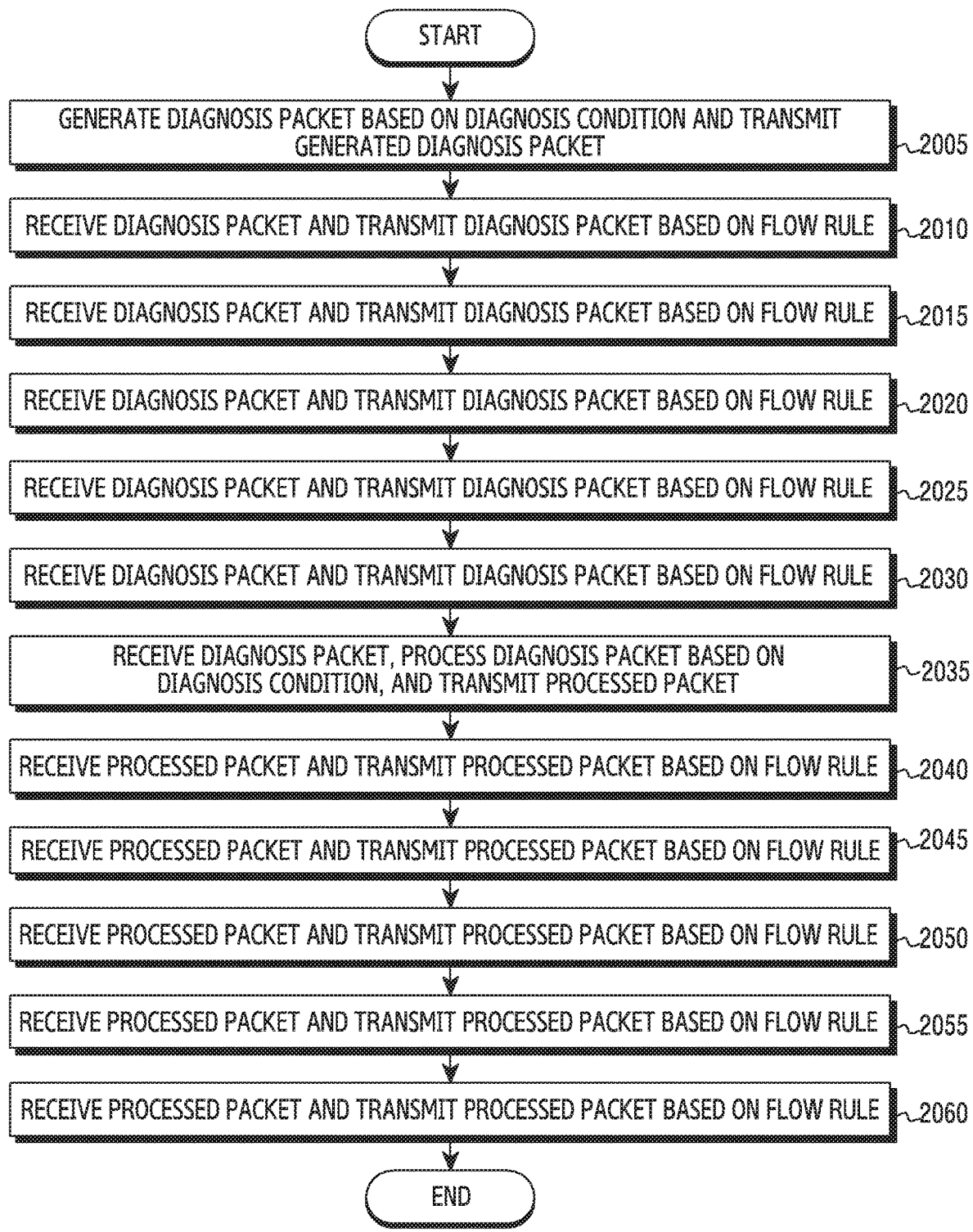
FIG. 20 is a flowchart of operations for transmitting/receiving a test packet for a network quality test in a communication system according to various embodiments of the disclosure.
Figure 21:
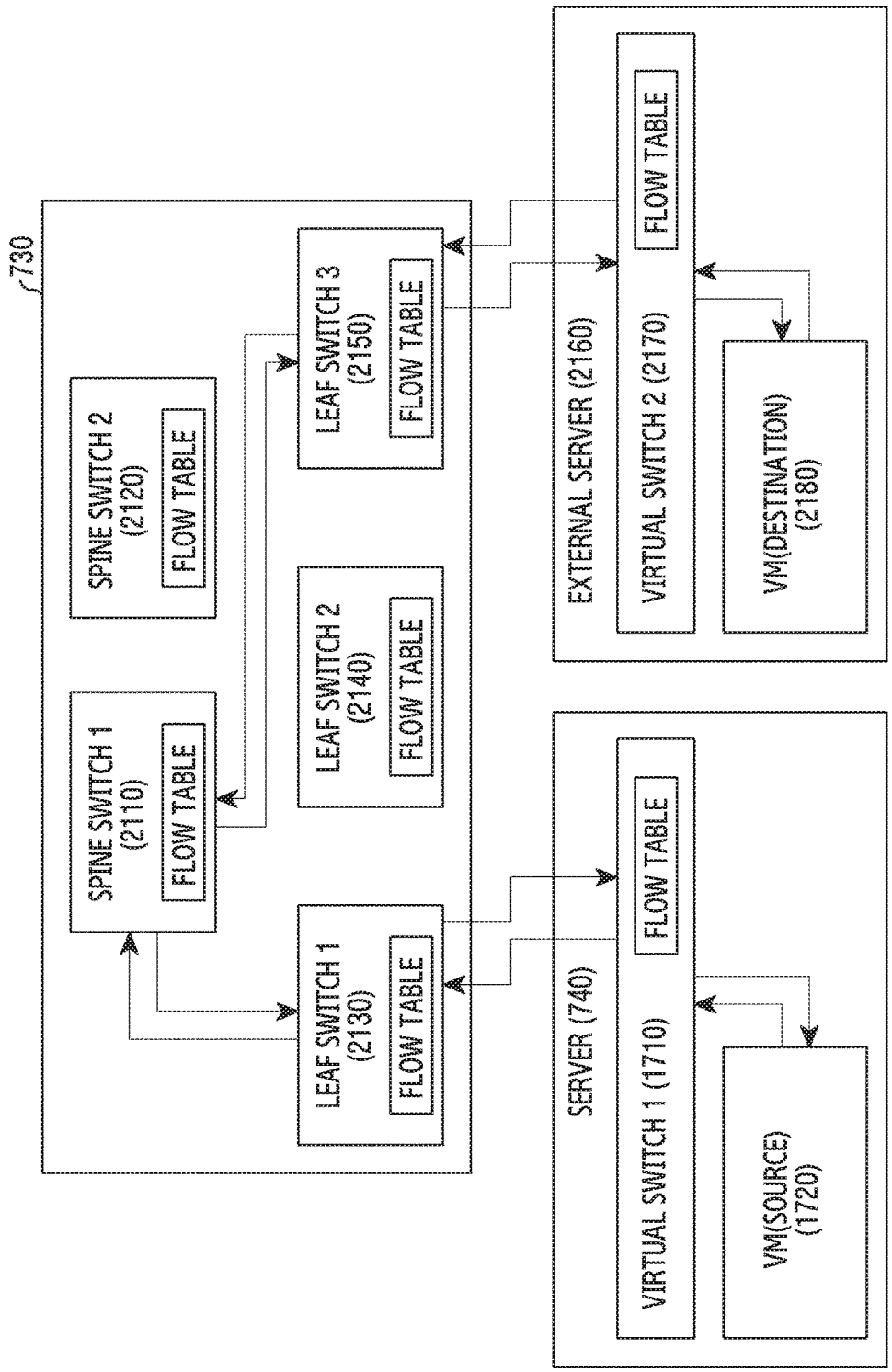
FIG. 21 illustrates a path of movement of a test packet for a network quality test in a communication system according to various embodiments of the disclosure.

FIG. 20 is a flowchart of operations for transmitting/receiving a test packet for testing network quality according to various embodiments of the disclosure. The flowchart of FIG. 20 is related to a situation in which the test packet is transmitted/received through the path illustrated in FIG. 21: "VM (source) 1730->first virtual switch 1710->first leaf switch 2130->first spine switch 2110->third leaf switch 2150->second virtual switch 2710->VM (destination) 2180". However, this is only for convenience of description, and the test packet may be transmitted/received through a path different from the path illustrated in FIG. 21, depending on how the destination target is configured. In addition, the switch 730 in FIG. 21 includes a first spine switch 710, a second spine switch 2120, a first leaf switch 2130, a second leaf switch 2140, and a third leaf switch 2150, but this is only for convenience of description, and the switch 730 may include various numbers of spine switches and various numbers of leaf switches. In FIG. 21, the external server 2160 may be identified with an external text device 750. Alternatively, the external server 2160 and the second virtual switch 2170 may be identified with the server 740 and the first virtual switch 1710, respectively. In this case, the test packet may be transmitted/received through the path "VM (source) 1730->first virtual switch 1710 (or second virtual switch 2170)->VM (destination) 2180", and the switch 730 may not be used.

Referring to FIG. 20, in step 2005, the VM (source) 1730 generates a test packet based on a test condition, and transmits the generated test packet to the VM (destination) 2180. The server 740 may control the VM (source) 1730 so as to generate a test packet based on a test condition and to transmit the generated test packet to the VM (destination) 2180.

In step 2010, the first virtual switch 1710 receives the test packet, and transmits the test packet based on a flow rule. The processor 1010 of the server 740 may control the first virtual switch 1710 to receive the test packet and to transmit the test packet based on a flow rule. The first virtual switch 1710 may identify the flow rule corresponding to the received test packet, based on information regarding the flow rule included in the received test packet, with reference to the flow table stored in the first virtual switch 1710. The first virtual switch 1710 may transmit the test packet to the NE indicated by the identified flow rule (that is, first leaf switch 2130).

In step 2015, the first leaf switch 2130 receives the test packet and transmits the test packet based on the flow rule. The first leaf switch 2130 may identify the flow rule corresponding to the received test packet, based on information regarding the flow rule included in the received test packet, with reference to the flow table stored in the first leaf switch 2130. The fist leaf switch 2130 may transmit the test packet to the NE indicated by the identified flow rule (that is, first spine switch 2110).

In step 2020, the first spine switch 2110 receives the test packet and transmits the test packet based on the flow rule. The first spine switch 2110 may identify the flow rule corresponding to the received test packet, based on information regarding the flow rule included in the received test packet, with reference to the flow table stored in the first spine switch 2110. The first spine switch 2110 may transmit the test packet to the NE indicated by the identified flow rule (that is, third leaf switch 2150).

In step 2025, the third leaf switch 2150 receives the test packet and transmits the test packet based on the flow rule. The third leaf switch 2150 may identify the flow rule corresponding to the received test packet, based on information regarding the flow rule included in the received test packet, with reference to the flow table stored in the third leaf switch 2150. The third leaf switch 2150 may transmit the test packet to the NE indicated by the identified flow rule (that is, second virtual switch 2170).

In step 2030, the second virtual switch 2170 receives the test packet and transmits the test packet based on the flow rule. The second virtual switch 2170 may identify the flow rule corresponding to the received test packet, based on information regarding the flow rule included in the received test packet, with reference to the flow table stored in the second virtual switch 2170. The second virtual switch 2170 may transmit the test packet to the NE indicated by the identified flow rule (that is, VM (destination) 2180).

In step 2035, the VM (destination) 2180 receives the test packet, processes the test packet based on the test condition, and transmits the processed test packet to the VM (source) 1730. For example, the VM (destination) 2180 may perform a process corresponding to the test protocol of the test condition with regard to the test packet, and may transmit the processed test packet to the VM (source) 1730.

In step 2040, the second virtual switch 2170 receives the processed test packet and transmits the processed test packet based on the flow rule. The second virtual switch 2170 may identify the flow rule corresponding to the received test packet, based on information regarding the flow rule included in the received test packet, with reference to the flow table stored in the second virtual switch 2170. The second virtual switch 2170 may transmit the processed test packet to the NE indicated by the identified flow rule (that is, third leaf switch 2150).

In step 2045, the third leaf switch 2150 receives the processed test packet and transmits the processed test packet based on the flow rule. The third leaf switch 2150 may identify the flow rule corresponding to the received test packet, based on information regarding the flow rule included in the received test packet, with reference to the flow table stored in the third leaf switch 2150. The third leaf switch 2150 may transmit the processed test packet to the NE indicated by the identified flow rule (that is, first spine switch 2110).

In step 2050, the first spine switch 2110 receives the processed test packet and transmits the processed test packet based on the flow rule. The first spine switch 2110 may identify the flow rule corresponding to the received test packet, based on information regarding the flow rule included in the received test packet, with reference to the flow table stored in the first spine switch 2110. The first spine switch 2110 may transmit the processed test packet to the NE indicated by the identified flow rule (that is, first leaf switch 2130).

In step 2055, the first leaf switch 2130 receives the processed test packet and transmits the processed test packet based on the flow rule. The first leaf switch 2130 may identify the flow rule corresponding to the received test packet, based on information regarding the flow rule included in the received test packet, with reference to the flow table stored in the first leaf switch 2130. The first leaf switch 2130 may transmit the processed test packet to the NE indicated by the identified flow rule (that is, first virtual switch 1710).

In step 2060, the first virtual switch 1710 receives the processed test packet and transmits the processed test packet based on the flow rule. The processor 1010 of the server 740 may control the first virtual switch 1710 so as to receive the processed packet and to transmit the processed packet to the VM (source) 1730 based on the flow rule. The first virtual switch 1710 may identify the flow rule corresponding to the received test packet, based on information regarding the flow rule included in the received test packet, with reference to the flow table stored in the first virtual switch 1710. The first virtual switch 1710 may transmit the processed test packet to the NE indicated by the identified flow rule (that is, VM (source 1730).

Figure 22:
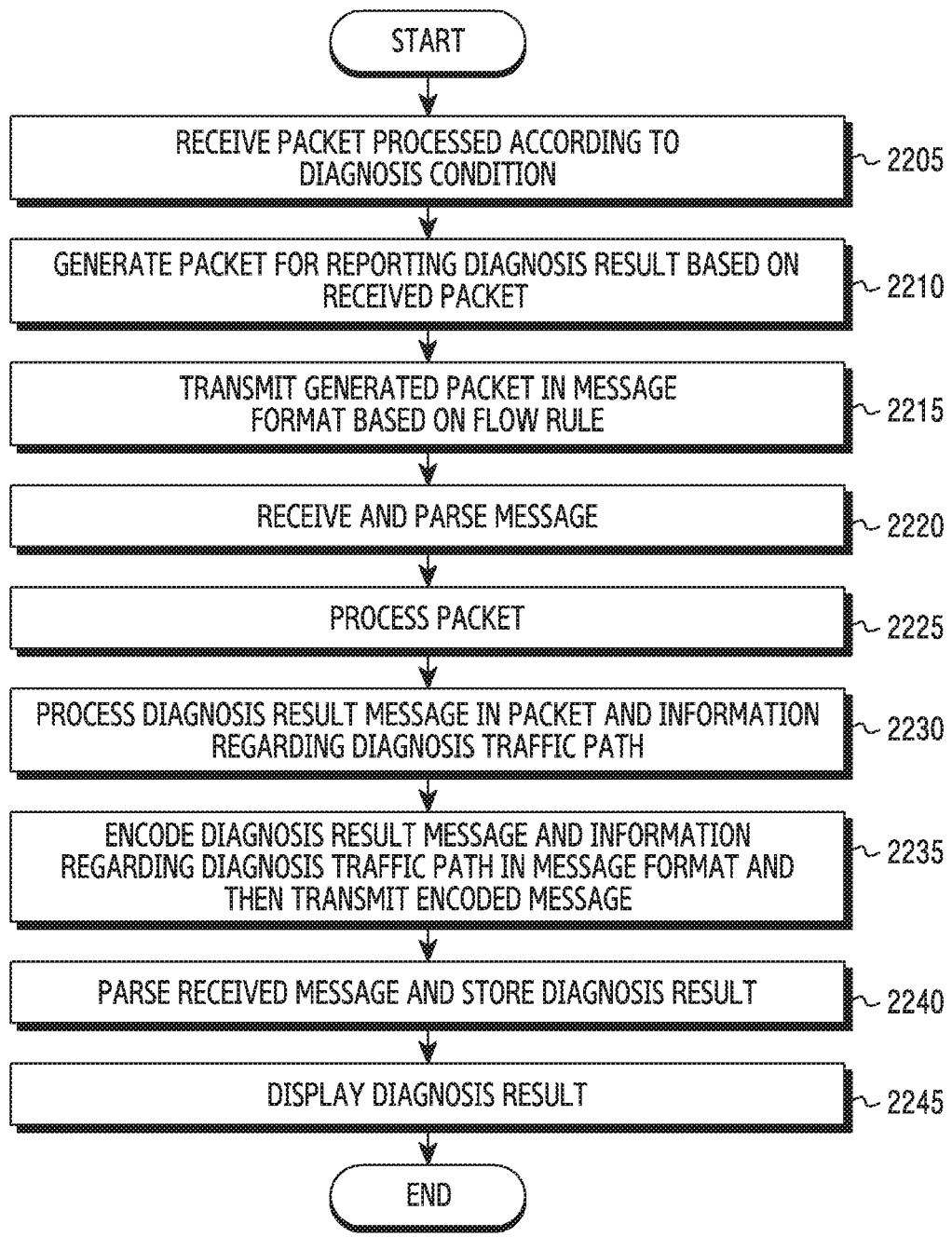
FIG. 22 is a flowchart of operations for processing the result of a network quality test in a communication system according to various embodiments of the disclosure.

FIG. 22 is a flowchart of operations for processing the result of a network quality test according to various embodiments of the disclosure.

Referring to FIG. 22, in step 2205, the test agent 1730 of the VM 1720 receives a packet processed according to a test condition from the first virtual switch 1710. The processor 1010 of the server 740 may control the test agent 1730 of the VM 1720 to receive a packet processed according to a test condition from the first virtual switch 1710.

In step 2210, the test agent 1730 of the VM 1720 generates a packet for reporting the test result based on the received packet. The processor 1010 of the server 740 may control the test agent 1730 of the VM 1720 to generate a packet for reporting the test result based on the received packet. The packet for reporting the test result may include information regarding the result of testing network quality with regard to the path between the source target and the destination target. According to various embodiments of the disclosure, the packet for reporting the test result may include content as given in Table 2 below:

TABLE 2

Test Result
   Test ID
   Result Type (Text / CSV / etc.)
   SLA Metrics (Bandwidth, Loss, Delay, Jitter, MOS, etc.)

In addition, the packet for reporting the test result may include information regarding a flow rule related to the path between the management device 710 and the VM 1720. Accordingly, the management device 710 may receive the packet for reporting the test result from the VM 1720. For example, the VM 1720 may receive information regarding the flow rule related to the path between the management device 1710 and the VM 1720 from the packet related to the diagnosis request message, received in step 1965, and may cause the information regarding the flow rule included in the test packet. The test agent 1730 of the VM 1720 may transmit the packet for reporting the test result to the controller device 720.

In step 2215, the server 740 transmits a packet generated based on the flow rule to the controller device 720 in a message format. The communication unit 1020 of the server 740 may transmit a packet generated based on the flow rule to the controller device 720 through a backhaul 1030 in a message format. The virtual switch 1710 of the server 740 may receive the packet for reporting the test result, transmitted by the test agent 1730 of the VM 1720, and may identify the flow rule corresponding to the received packet, based on information regarding the flow rule included in the received packet, with reference to the flow table stored in the virtual switch 1710. The virtual switch 1710 may transmit the packet for reporting the test result to the NE indicated by the identified flow rule. For example, the virtual switch 1710 may transmit the packet for reporting the test result to the controller device 720 through the switch 730 according to the indication of the flow rule, or may transmit the same directly to the controller device 720, not through the switch 730. The packet transmitted to the controller device 720 may be encoded in a message format and then transmitted.

In step 2220, the controller device 720 receives a message from the switch 730 or the server 740 and parses the received message. The communication unit 920 of the controller device 720 may receive a message from the switch 730 or the server 740 through the communication unit 920, and the processor 910 may parse the received message. When the message is received, the open flow SB protocol 1620 of the controller 720 may parse the message, and may transmit information regarding the result of testing network quality to the packet manager 1612. The packet manager 1612 may generate a packet including information regarding the result of testing network quality. According to various embodiments of the disclosure, the generated packet may include content as given in Table 3 below:

TABLE 3

Test Result
    Test ID
    Result Type (Text / CSV / etc.)
    SLA Metrics (Bandwidth, Loss, Delay, Jitter, MOS, etc.)
    Path between source target and destination target In step 2225, the controller device 720 processes the packet. The processor 910 of the controller device 720 may process the packet. The packet manager 1612 of the controller device 720 may deliver a packet including the generated information regarding the result of testing network quality to the QoE diagnosis manager 1603.

In step 2230, the controller device 720 processes the test result message in the packet and information regarding a test traffic path. The processor 910 of the controller device 720 may process the test result message in the packet and information regarding a test traffic path. The test result message may include information regarding the result of testing network quality, and the test traffic path may include information regarding the path between the source target and the destination target. The QoE diagnosis manager 1603 may deliver the test result message in the packet and information regarding a test traffic path to the QoE result message processing unit 1603.

In step 2235, the controller device 720 may encode the test result message and the information regarding a traffic path in a message format, and may transmit the encoded message to the management device 710. The processor 910 of the controller device 720 may encode the test result message and the information regarding a traffic path in a message format, and the communication unit 920 may transmit the encoded message to the management device 710 through the communication unit 920. The QoE result message processing unit 1603 may encode the test result message and the information regarding a traffic path in a message format, and may transmit the encoded message to the management device 710.

In step 2240, the management device 710 parses the received message so as to acquire information regarding the test result, and stores the test result. The communication unit 830 of the management device 710 may receive the encoded message from the controller device 720 through a backhaul 840, and the processor 820 may parse the received message so as to acquire information regarding the test result. In addition, the processor 820 may store the test result in the storage unit 850. The QoE diagnosis manager 1511 of the management device 710 may parse the received message so as to acquire information regarding the test result, and store the test result in the QoE diagnosis storage unit 1521.

In step 2245, the management device 710 displays the test result. The display 810 of the management device 710 may display the test result. To this end, the QoE diagnosis manager 1511 may provide information regarding the test result to respective display modules 1101-1109 of the management device 710 such that respective display modules update information regarding the test result related thereto. The display 810 of the management device 710 may display the test result, the content of which is illustrated in FIG. 23A to FIG. 23F, through a UI.

FIG. 23A to FIG. 23F illustrate examples of a UI for displaying the result of a network quality test according to various embodiments of the disclosure.

Figure 23A:
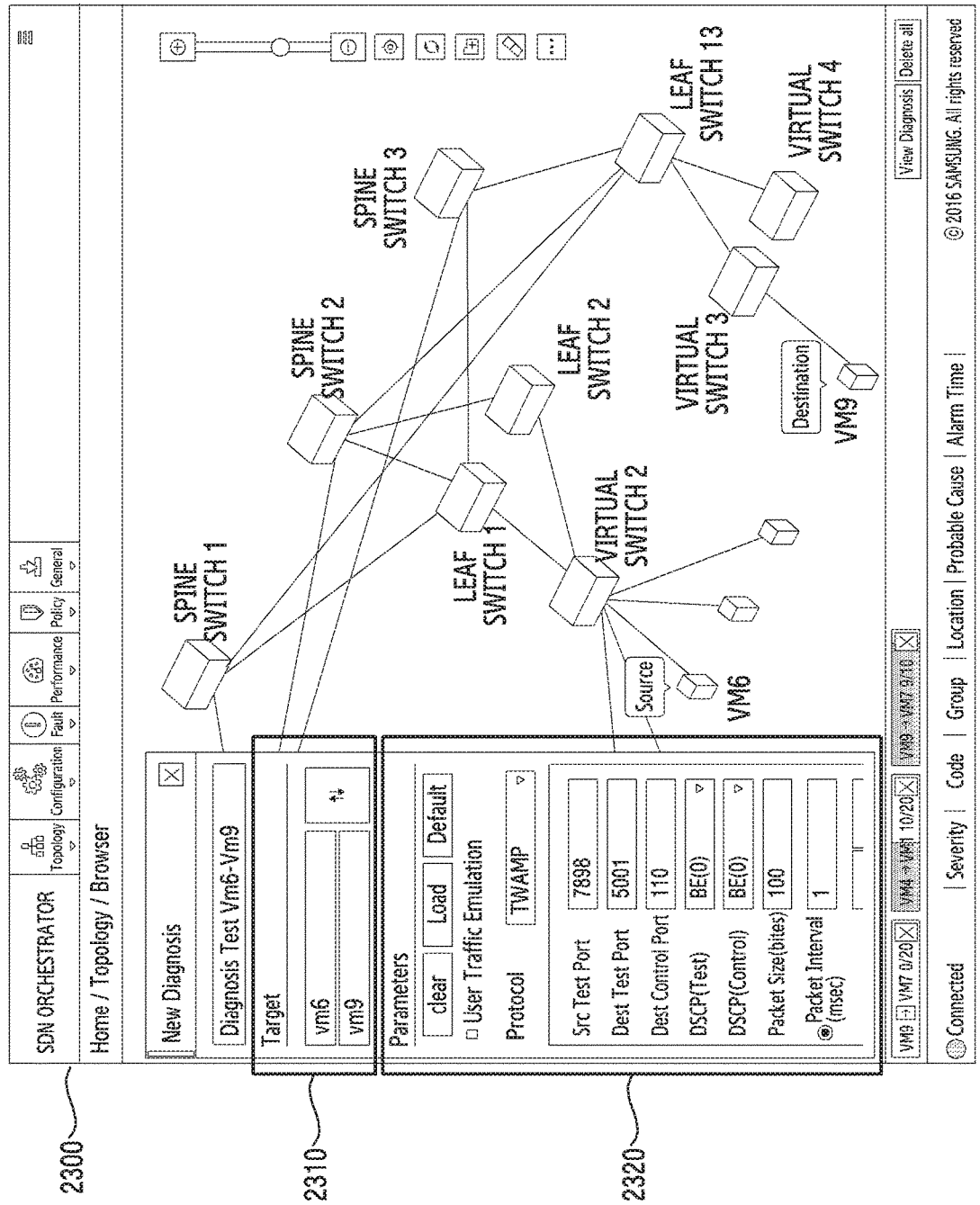

Referring to FIG. 23A, in the first display area 2310 of the UI 2300, information regarding targets (source target and destination target), for which network quality is measured, is display. For example, the first display area 2310 indicates that the source target is vm6, and the destination target is vm9. In the second display area 2320 of the UI 2300, information regarding the test condition used to test network quality is displayed. For example, the second display area 2320 may indicate various parameter values used to test network quality, and a test protocol (for example, TWAMP). Moreover, the UI 2300 may visually display the structure of a DC related to the source target and the destination target. For example, the UI 2300 may visually display the logical deployment structure and logical position of the NEs included in the DC.

Figure 23B:
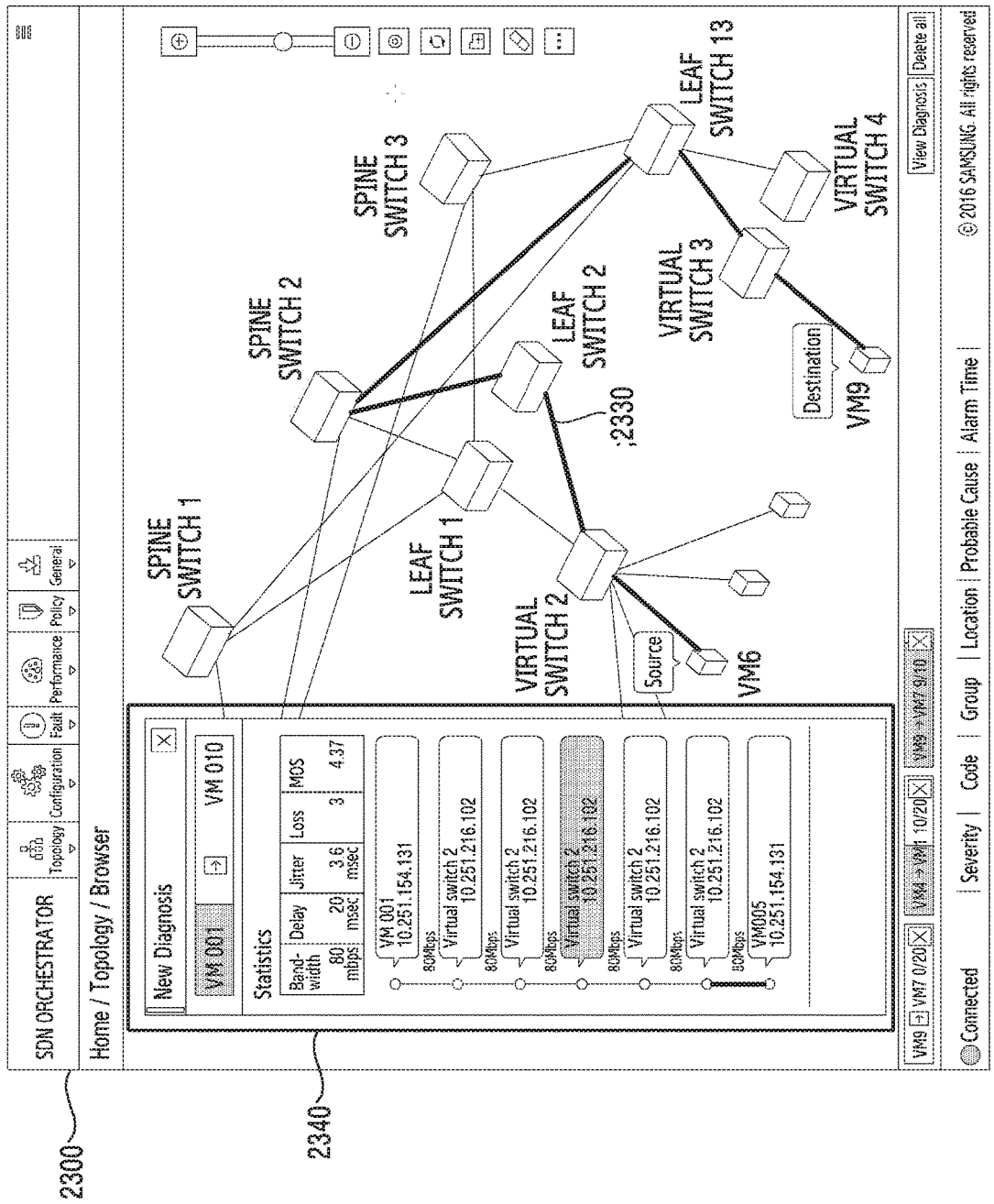

Referring to FIG. 23B, the UI 2300 may display a path 2330 between a source target and a destination target, for which network quality is measured. FIG. 23B illustrates an exemplary path 2330 "VM6 (source target)->second virtual switch->second leaf switch->second spine switch->third leaf switch->third virtual switch->VM9 (destination target)". In addition, the third display area 2340 of the UI 2300 may display indices indicating the result of network quality (for example, bandwidth, delay, jitter, loss, MOS), and information regarding to which value each index corresponds with regard to the entire path 2330 and respective direct paths constituting the path 2330.

Figure 23C:
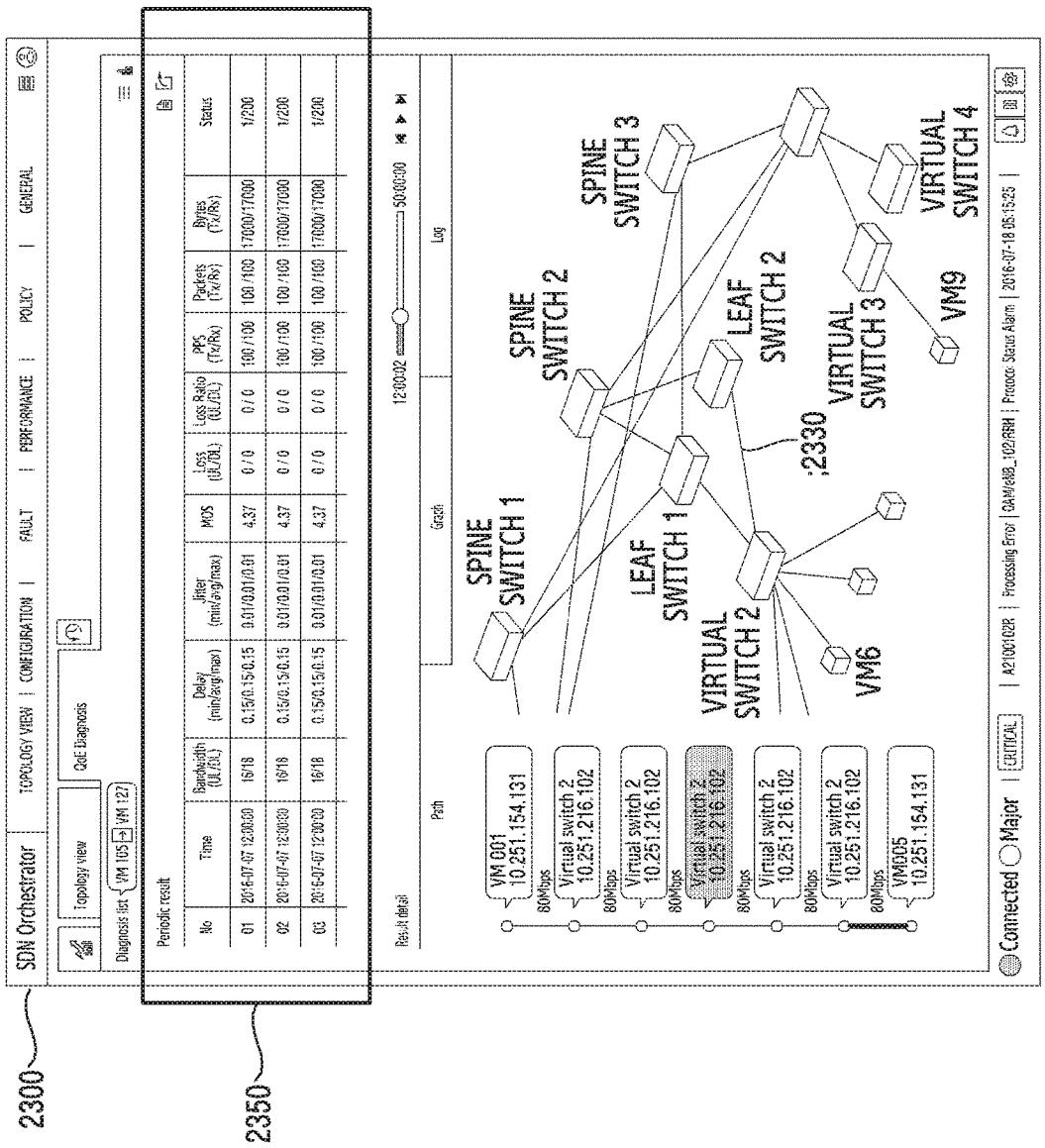

Referring to FIG. 23C, the fourth display area 2350 of the UI 2300 may display values of respective indices regarding the path 2330 on a time basis. As a result thereof, the user may understand how values of respective indices regarding the path 2330 values change over time.

Figure 23D:
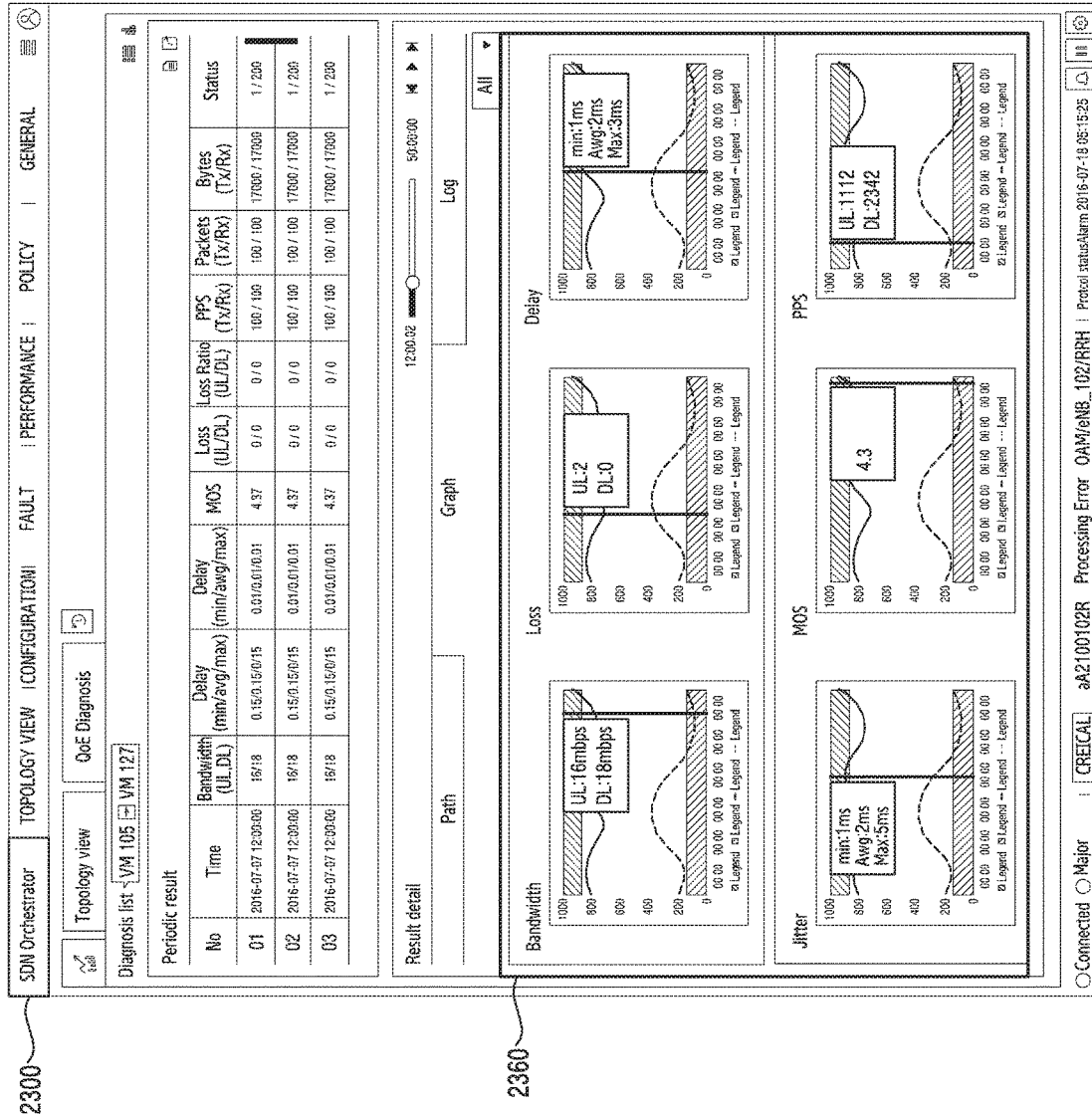

Referring to FIG. 23D, the fifth display area 2360 of the UI 2300 may display a graph having the time as an independent variable and having an index value as a dependent variable, with regard to respective indices. A specific time value may be selected from the time axis of the graph with regard to respective indices, and the index value at the specific time value in this case may be displayed.

Figure 23E:
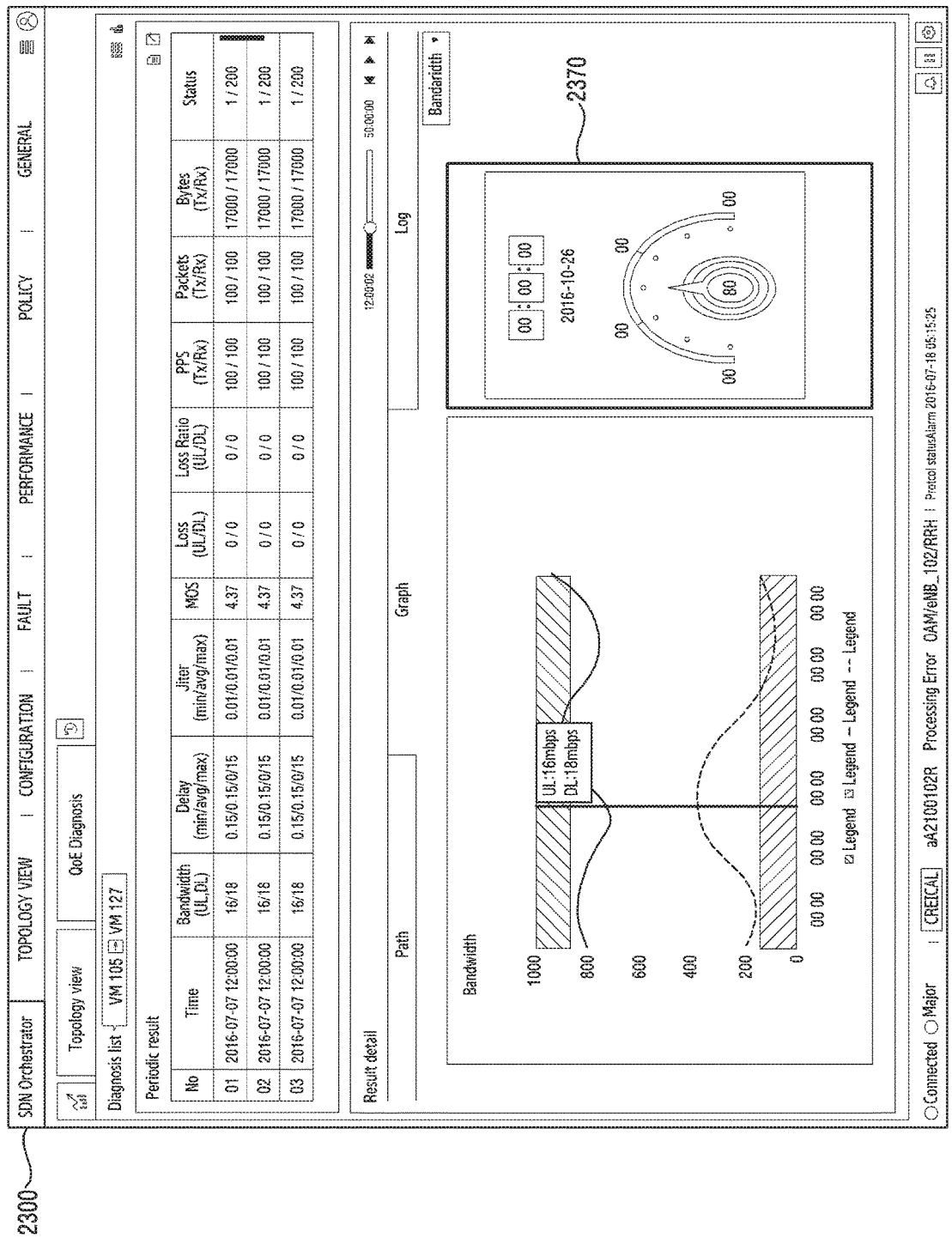

Referring to FIG. 23E, the sixth display area 2370 of the UI 2300 may display a time-dependent index value with regard to a specific index (for example, bandwidth), and the degree of quality indicted by the index value. For example, the degree of quality may be classified into good quality, normal quality, and bad quality. The sixth display area 2370 of the UI 2300 may display an index value regarding a specific index at a specific time, and may display, through an arrow-shaped indictor, the category (among good, normal, and bad) to which the index value belongs.

Figure 23F:
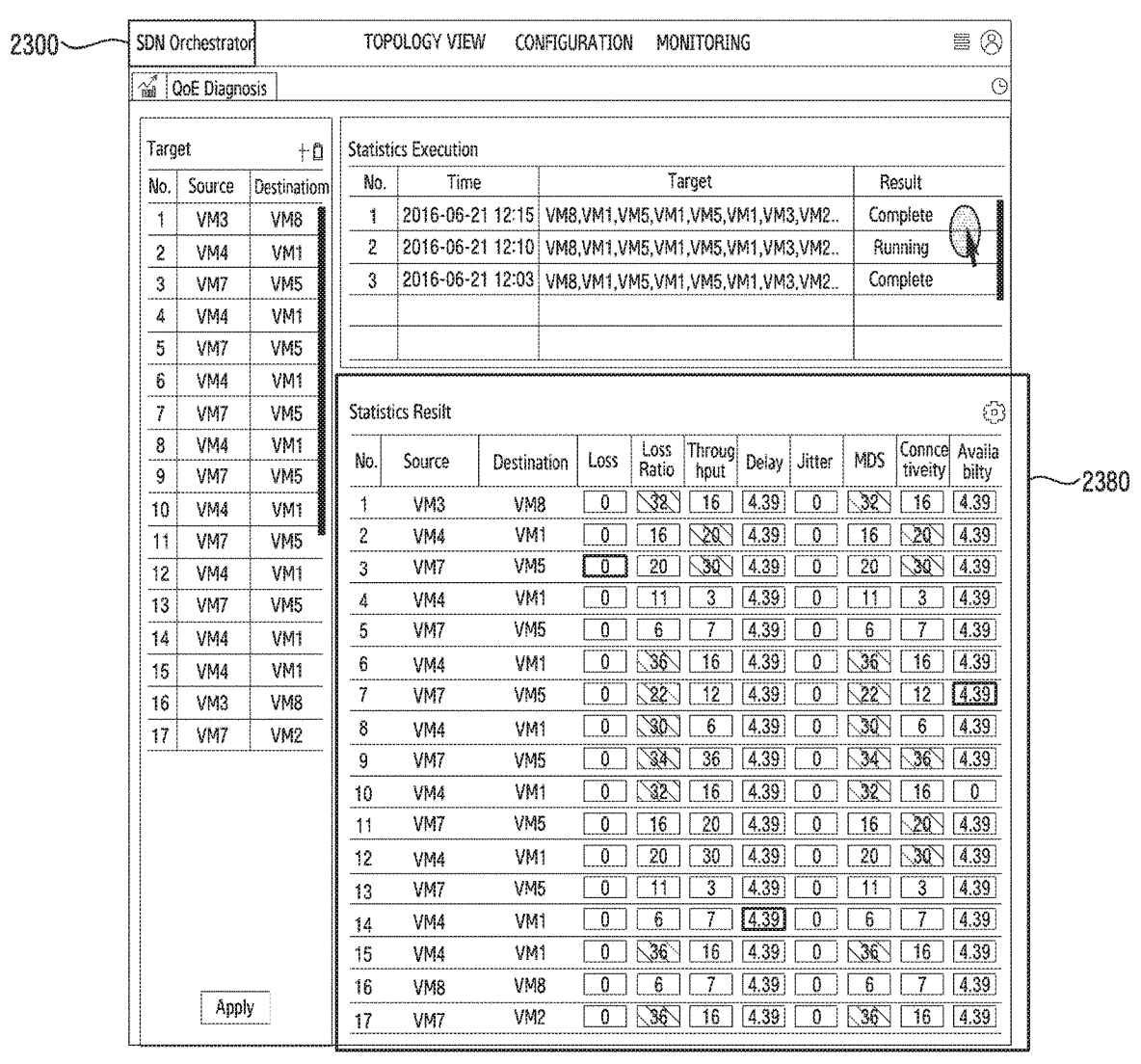

Referring to FIG. 23F, the seventh display area 2380 of the UI 2300 may display statistic information regarding multiple results of network quality tests. Each of the multiple results of network quality tests may have an index assigned thereto so as to indicate the specific result of network quality test, and the seventh display area 2380 may display the source target, the destination target, and index values regarding the test result, corresponding to each index.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A software defined network (SDN) management device in a communication system, the management device comprising:
    at least one transceiver; and
    at least one processor operably coupled to the at least one transceiver, configured to:
        identify a test object and a test condition from a user input, wherein the test object indicates a source target and a destination target associated with a path in a data center (DC) based on topology information regarding at least one spine switch and at least one leaf switch in the DC,
        transmit, to an SDN controller device, a measurement request message including first information on the source target, second information on the destination target, and third information on the test condition,
        receive, from the SDN controller device, result information including:
            information on a network quality for the path, and
            information on the path for which the network quality is measured, and
        display the result information on the network quality and the path,
    wherein the network quality is measured based on the test condition,
    wherein the third information on the test condition includes information on a number of test packets,
    wherein at least one of the source target or the destination target is implemented in a server operating as a virtual machine (VM), and
    wherein network elements (NEs) of the path include a virtual switch connected to the VM.

2. The SDN management device of claim 1, wherein the third information on the test condition further includes information on a protocol used to measure the network quality.

3. The SDN management device of claim 2, wherein the third information on the test condition further includes information on a test packet size and information on a test packet interval.

4. The SDN management device of claim 1, wherein the result information includes at least one of:
    an address regarding each of the targets;
    information regarding the path between the targets;
    a bandwidth regarding a packet transmitted/received between the targets, delay;
    a jitter;
    a loss;
    a loss ratios;
    a mean opinion score (MOS);
    packets per second (PPS);
    an amount of packets;
    information regarding a packet size;
    information regarding a change in the network quality over time; or
    statistical information regarding the network quality.

5. The SDN management device of claim 1, wherein the NEs of the path includes a leaf switch connected to the VM, a leaf switch and a spine switch connected to another VM.

6. A software defined network (SDN) controller device in a communication system, the controller device comprising:
    at least one transceiver; and
    at least one processor operably coupled to the at least one transceiver, configured to:
        receive, from a SDN management device, a message including first information on a source target of a path in a data center (DC), second information on a destination target of the path, and third information on a test condition, wherein the path is associated with topology information regarding at least one spine switch and at least one leaf switch in the DC,
        identify the path between the source target and the destination target and a first flow rule regarding the path, transmit, to each of network elements (NEs) of the path, path information including information on the first flow rule, and transmit, to the source target and the destination target, a measurement request message including information on the test condition and information on the path, to obtain a network quality for the path, wherein the network quality is measured based on the path information and the measurement request message, wherein the first flow rule is configured to indicate a next NE in which a test packet is to be transmitted from a corresponding NE in which the test packet is received, wherein the third information on the test condition includes information on a number of test packets, wherein at least one of the source target or the destination target is implemented in a server operating as a virtual machine (VM), and wherein the NEs of the path include a virtual switch connected to the VM.

7. The SDN controller device of claim 6, wherein the NEs further includes at least one of a physical switch, or a data center interconnect (DCI).

8. The SDN controller device of claim 6,
wherein the at least one processor is further configured to:
identify a second flow rule for receiving information on the network quality, and
transmit the second flow rule to each of the NEs of the path, and
wherein the second flow rule is configured to indicate a next NE in which a result of the network quality is to be transmitted from a corresponding NE in which of the network quality is received.

9. The SDN controller device of claim 8, wherein the at least one processor is further configured to:
receive, based on the second flow rule, the information on the network quality; and
transmit, to the SDN management device, result information including:
the information on the network quality, and
information on the path for which the network quality is measured.

10. The SDN controller device of claim 6, wherein the third information on the test condition further includes information on a protocol used to measure the network quality.

11. The SDN controller device of claim 10, wherein the third information on the test condition further includes information on a test packet size and information on a test packet interval.

12. The SDN controller device of claim 6, wherein the NEs of the path includes a leaf switch connected to the VM, a leaf switch and a spine switch connected to another VM.

* * * * *